US008084742B1

(12) United States Patent
Nagarkar

(10) Patent No.: US 8,084,742 B1
(45) Date of Patent: Dec. 27, 2011

(54) POSITRON EMISSION TOMOGRAPHY WITH PHOSWICH DETECTOR, SYSTEMS AND METHODS

(75) Inventor: Vivek Nagarkar, Weston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 12/721,462

(22) Filed: Mar. 10, 2010

(51) Int. Cl.
*G01T 1/164* (2006.01)
(52) U.S. Cl. .................................. 250/363.03
(58) Field of Classification Search .. 250/363.01–363.1, 250/370.01–370.15, 580; 378/98.8
See application file for complete search history.

(56) References Cited

U.S. PATENT DOCUMENTS

| | | | | |
|---|---|---|---|---|
| 4,398,092 | A * | 8/1983 | Carlson | 250/361 R |
| 7,504,634 | B2 | 3/2009 | Shah | |
| 2002/0014603 | A1* | 2/2002 | Nagli | 250/581 |
| 2004/0159792 | A1* | 8/2004 | Andreaco et al. | 250/363.03 |
| 2007/0096031 | A1* | 5/2007 | Meier et al. | 250/370.11 |
| 2007/0237668 | A1* | 10/2007 | Martins Loureiro et al. | 419/48 |
| 2008/0286461 | A1* | 11/2008 | Noguchi et al. | 427/248.1 |
| 2009/0136731 | A1* | 5/2009 | Tatartchenko et al. | 428/220 |
| 2009/0200479 | A1* | 8/2009 | Nomura et al. | 250/370.11 |

OTHER PUBLICATIONS

Shimizu et al., "Characteristics of Lu1.8Gd0.2SiO5:Ce (LGSO) for APD-based PET detector," 2008, IEEE Nuclear Science Sympositum Conference Record, pp. 4938-4944.*
Maas et al., "Monolithic scintillator PET detectors with intrinsic depth-of-interaction correction," 2009, Physics in Medicine and Biology, 2009, vol. 54, pp. 1893-1908.*
Babla et al., "A triple-head solid state camera for cardiac single photon emission tomography," *Proc. of SPIE* 6319:63190M 1-5 (2006).
Bartzakos & Thompson, "A PET detector with depth-of-interaction determination," *Phys. Med. Biol.* 36(6): 735-748 (1991).
Burr et al., "Evaluation of a prototype small-animal PET detector with depth-of-interaction encoding," *IEEE Trans. Nucl. Sci.* 51(4):1791-1798 (2004).
Derenzo et al., "Initial characterization of a position-sensitive photodiode/BGO detector for PET," *IEEE Trans. Nucl. Sci.* 36(1):1-6 (1989).
Gramsch, "Measurement of the depth of interaction of an LSO scintillator using a planar process ADP," *IEEE Trans. on Nucl. Sci.* 50 (3):307-312 (2003).
Huber et al., "An LSO scintillator array for a PET detector module with depth of interaction measurement," *IEEE Trans. Nucl. Sci.* 48:684-688 (2001).
Inadama et al., "A Depth of Interaction Detector for PET with GSO Crystals doped with Different amount of Ce," IEEE, 1099-1103 (2002).
Karp & Daube-Witherspoon, "Depth-of-interaction determination in NaI(Tl) and BGO scintillation crystals using a temperature gradient," *Nucl. Instr. Methods Phys. Res.* A260:509-517 (1987).
Knoll, "Specialized Detector Configurations Based on Scintillation," in: *Radiation Detection and Measurement*, Second Edition, John Wiley & Sons, NY, p. 344-345 (1989).
Knoll, "Pulse Shape Discrimination," in: *Radiation Detection and Measurement*, Third Edition, Glenn F. Knoll, John Wiley & Sons, NY, p. 646 (2000).
Kupinski and Barrett, *Small-Animal SPECT Imaging*, Springer Science+Business Media Inc. (2005).
Ling et al., "Depth of interaction decoding of a continuous crystal detector module," *Phys. Med. Biol.* 52:2213-2228 (2007).

(Continued)

*Primary Examiner* — Kiho Kim
(74) *Attorney, Agent, or Firm* — Kilpatrick Townsend & Stockton LLP

(57) ABSTRACT

Imaging systems including phoswich scintillator detectors, related devices and methods.

34 Claims, 20 Drawing Sheets

OTHER PUBLICATIONS

MacDonald & Dahlbom, "Depth of interaction for PET using segmented crystals," *IEEE Trans. Nucl. Sci.* 45(4):2144-2148 (1998).
Miyaoka et al., "Design of a depth of interaction (DOI) PET Detector Module," *IEEE Trans. on Nucl. Sci.* 45(3):1069-1073 (1998).
Moisan et al., "Segmented LSO crystals for depth-of-interaction encoding in PET," *IEEE Trans. Nucl. Sci.* 45(6):3030-3035 (1998).
Murayama et al., "Design of a depth of interaction detector with a PS-PMT for PET," *IEEE Trans. Nucl. Sci.* 47(3):1045-1050 (2000).
Nagarkar et al., "Microcolumnar and polycrystalline growth of $LaBr_3$:Ce scintillator," *Nucl. Instr. and Meth.* A (2010), doi:10.1016/j.nima.2010.06.190.
Nagarkar et al., "Development of microcolumnar $Labr_3$:Ce scintillator," *Proc. of SPIE* 7450:745006-1-745006-10 (2009).
Saoudi et al., "Investigation of depth-of-interaction by pulse shape discrimination in multicrystal detectors read out by avalanche photodiodes," *IEEE Trans. Nucl. Sci.* 46(3):462-467 (1999).
Schramm et al., High-resolution SPECT using multi-pinhole collimation, *IEEE Trans. Nucl. Sci.* 50(3):774-777 (2003).
Seidel et al., "Depth identification accuracy of a three layer phoswich PET detector module," *IEEE Trans. Nucl. Sci.* 46(3):485-490 (1999).
Shah et al., "$LcCl_3$:Ce scintillator for γ-ray detection," *Nucl. Instr. and Meth. Phys. Res. A* 505: 76-81 (2003).
Shao et al., "Dual APD array readout of LSO crystals: optimization of crystal surface treatment," *IEEE Trans. Nucl. Sci.* 49(3):649-654 (2002).
Smith et al., "Design of multipinhole collimators for small animal SPECT," *IEEE NSS/MIC Conference Records* (2004).
Stahle et al., "Fabrication of CdZnTe strip detectors for large area arrays," *SPIE* 3115:90-97 (1997).
Streun et al., "Pulse shape discrimination of LSP and LuYAP scintillators for depth of intereaction detection in PET," *IEEE Trans. Nucl. Sci.* 50(3):344-347 (2003).
Tornai et al., Comparison of compact gamma cameras with 1.3- and 2.0-mm quantized *IEEE Trans. Nucl. Sci.* 52(5):1251-1256 (2005).
Yamamoto & Ishibashi, "A GSO depth of interaction detector for PET," *IEEE Trans. Nucl. Sci.* 45(3): 1078-1082 (1998).
Yamashita et al., "High resolution block detectors for PET," *IEEE Trans. Nucl. Sci.* 37(2):589-593 (1990).

* cited by examiner

POSITRON EMISSION TOMOGRAPHY WITH PHOSWICH DETECTOR, SYSTEMS AND METHODS

CROSS-REFERENCES TO RELATED APPLICATIONS

The present application is related to U.S. application Ser. No. 12/721,505, filed on Mar. 10, 2010 and U.S. application Ser. No. 12/721,489, filed on Mar. 10, 2010, each of which is being filed concurrently herewith, the full disclosures of which are incorporated herein by reference.

BACKGROUND OF THE INVENTION

The present invention relates generally to scintillator compositions and related structures and methods. More specifically, the present invention relates to phoswich scintillator compositions having dopant concentrations that vary continuously and sometimes monotonically at a desired minimum rate along a dimension of the scintillator, as well as related devices and methods of fabricating the scintillator compositions using evaporation-based techniques.

Positron emission tomography (PET) is an in-vivo nuclear medicine technique with proven record of accomplishment and with substantial potential to become an even more powerful tool in imaging biological processes in humans and small laboratory animals. With the ever-increasing number of human disease models, particularly in smaller animals such as mice and rats, the ability of high resolution PET technology to contribute important and unique information is apparent to researchers. An important advantage of this emission mode computed tomography technique is that functional data can be obtained non-invasively, allowing each subject to be studied repeatedly in order to monitor the effects of therapeutic interventions over time. With increasing applications of PET continually emerging, PET applications increasingly require systems with excellent spatial resolution, not only because of the small scale of the details to be imaged but also for both detection and quantitation tasks. Thus, there is a demand for economical yet high-performance PET instrumentation that simultaneously optimizes both spatial resolution and detection efficiency, while also offering energy resolution capabilities essential for the improvement of future PET devices.

Unfortunately, in spite of substantial recent improvements in detector technologies having high intrinsic resolution, further improvements are needed. One challenge to improving resolution in PET detectors results from current detectors posing significant challenges in maintaining spatial resolution in the face of parallax errors. Such errors can occur when radionuclide photons are captured at oblique angles using conventional sensors (see, e.g., FIGS. 1A and 1B). In PET the problem is called radial elongation; in SPECT it occurs most prominently with focusing collimators such as pinholes.

Radial elongation error in PET is illustrated with reference to FIG. 1A. For on-axis events, the spatial resolution is determined by the scintillator bar width. For off-axis events, with different depths of interaction, parallax degrades the spatial resolution. For pinhole collimators used in SPECT (e.g., FIG. 1B), different depths of interaction for events near the edge of the field-of-view show resolution degradation due to parallax. For example, parallax errors could be as high as 1.3 mm in SPECT imaging for 140 keV $^{99m}$Tc gamma ray imaging using a 30° pinhole, and that would completely defeat the 100 μm intrinsic resolution performance achievable with current high resolution photodetector systems. These errors are even higher in PET, where depth of penetration of the 511 keV gamma rays is even higher. The key to improving the spatial resolution performance of current detectors is to develop scintillator structures that minimize parallax errors and couple them to readout sensors with high intrinsic spatial resolution. Thus, a scintillation detector that allows depth-of-interaction (DOI) determination would be an important performance improvement for PET.

Previous attempts have been made to develop DOI scintillators for PET, but all of them had significant performance limitations. The use of decay time to provide DOI has been investigated before using discrete detectors (phoswich detectors). Previous phoswich ("phosphor sandwich") detectors have included a combination of different and distinct scintillators with dissimilar pulse shape characteristics optically coupled to each other and to (a) common photomultiplier tube(s) (PMT(s)). However, such approaches have thus far been limited in their success, as they typically face problems with detector fabrication, as well as with reflections at interfaces between the various different scintillators that are coupled together. Also, the DOI information is essentially limited to one or two bits, as only a limited number of layers of scintillators with varying decay time could be practically used without appreciable degradation in the signal-to-noise ratios.

Thus, there is a need for improved detectors and PET imaging systems, including those suitable for determining depth of interaction.

BRIEF SUMMARY OF THE INVENTION

The present invention provides phoswich scintillator detectors, related devices and methods, as well as evaporation-based methods and structures for fabricating phoswich scintillators. Phoswich detectors are useful in a variety of applications, including, for example, spectroscopy detection and imaging applications, such as positron emission tomography (PET).

In one aspect, the present invention provides phoswich detectors and devices. A phoswich detector can include a monolithic scintillator or slab (e.g., segment) including a doped scintillator composition, with the scintillator having a varying dopant concentration along a thickness or length. In one embodiment, the scintillator composition can include a doped lanthanum halide composition, such as cerium-doped $LaCl_3$. The detector may include a single layer or segment or a plurality of stacked layers/segments, with each segment having a dopant concentration varying along a length or thickness.

In another aspect, the present invention includes methods of fabricating a scintillator of a phoswich detector. Such a method includes providing an evaporation apparatus with an evaporation chamber having a substrate positioned in a holder in one portion of the chamber, and source boats positioned in another portion of the chamber. Source boats will generally include a first source boat laterally spaced from a second source boat, and one or more chamber walls, e.g., at least partially disposed around portions of the chamber. The method further includes positioning a dopant charge in the first source boat and a main scintillator component charge in the second boat; and depositing a scintillator film on a surface of the positioned substrate via source evaporation so as to produce a scintillator film having a dopant concentration varying along a length or thickness of the deposited material. The film can be deposited by a process including applying heat to the evaporation chamber so as to vaporize dopant and main scintillator material for film deposition while maintaining a temperature relationship of $T_{wall} > T_{source} > T_{substrate}$ for at least a portion of the deposition process. The method may further include forming at least one coating of reflective material or protective material on a surface of the scintillator film and/or forming the scintillator film on such a layer.

In yet another aspect, the present invention provides an evaporation apparatus for depositing scintillator material on a surface of a substrate. Such an apparatus can include an evaporation chamber having a first portion with a substrate holder, and a second portion with a first material source boat laterally spaced from a second material source boat. The apparatus further includes a material deposition control system or a heating system coupled to the evaporation chamber and configured to apply heating to the chamber. Chamber heating is selected so as to vaporize scintillator source materials positioned in the first and second boats for deposition of scintillator material having a dopant concentration varying along a length or thickness of the deposited material.

In another aspect, the present invention provides radiation imaging systems. An imaging system can include a phoswich detector as described herein. A phoswich detector can include a monolithic scintillator structure having a dopant concentration varying continuously along a depth of the scintillator. a phoswich detector can include an assembly of scintillator segments, the assembly including a first scintillator segment presenting a single-piece scintillator structure having a first side and a second side and a dopant concentration varying along a distance between the first and second sides. The system can further include a detector assembly including a photodetector coupled to the phoswich detector so as to detect a scintillation event light pulse from the scintillator and output a scintillation event signal and a processing unit coupled to the photodetector to receive the scintillation event signal and determine based on the received signal a depth of interaction of the scintillation event within the scintillation.

In another aspect, the present invention provides a positron emission tomography (PET) imaging system. The system includes a patient area; an assembly of radiation detectors disposed adjacent to the patient area, wherein at least one of the radiation detectors comprises: a phoswich detector; and a control system coupled to the radiation detectors.

In another aspect, the present invention provides a method of detecting radiation from a source. Such a method can include providing a detection system comprising a phoswich detector as described herein, and a detector assembly coupled to the phoswich detector to detect a light pulse luminescence from the scintillator or scintillator segment (e.g., monolithic scintillator or single-piece scintillator/segment) as a measure of a scintillation event. The method further includes positioning the system such that a radiation source is within a field of view of the system so as to detect emissions from the source, and measuring a scintillation event luminescence signal from the scintillator or scintillator segment. The method addition can include processing the measured luminescence signal so as to identify a depth of interaction of the scintillation event within the scintillator or scintillator segment.

For a fuller understanding of the nature and advantages of the present invention, reference should be had to the ensuing detailed description taken in conjunction with the accompanying drawings. The drawings represent embodiments of the present invention by way of illustration. The invention is capable of modification in various respects without departing from the invention. Accordingly, the drawings/figures and description of these embodiments are illustrative in nature, and not restrictive.

BRIEF DESCRIPTION OF THE DRAWINGS

FIG. 10A shows a scintillator with a dopant concentration varying (e.g., continuously) along a thickness of the scintillator.
FIG. 10B shows a scintillator with a dopant concentration varying along a length of the scintillator.
FIG. 10C shows a plurality of scintillator segments as in FIG. 10A in a stacked arrangement such that dopant concentrations are arranged in sequence.
FIG. 10D shows a plurality of scintillator segments as in FIG. 10B in a stacked arrangement such that dopant concentration variations are arranged substantially in parallel.
FIG. 10E shows a plurality of scintillator segments in a stacked arrangement, with segment dopant concentrations substantially constant (or non-varying) within each segment but differing between different segments.

DETAILED DESCRIPTION OF THE INVENTION

Figure 1A:
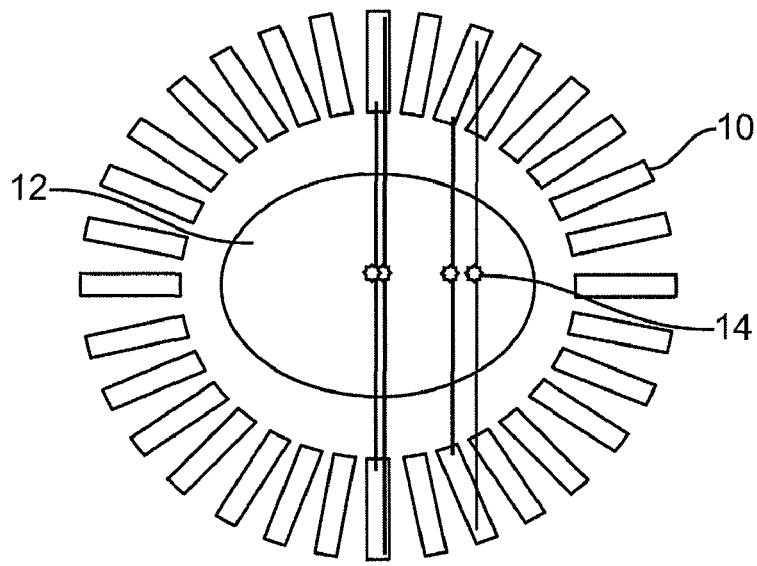
FIG. 1A illustrates elongation error in PET.

The present invention provides phoswich scintillator detectors, related devices and methods, as well as evaporation-based methods and structures for fabricating phoswich scintillators.

In one aspect, the present invention provides scintillator compositions in which the rise time and/or decay time of the light emission varies continuously along a dimension of the scintillator, such as varying continuously with depth. Such variation of decay time of the light emission is a property reflective of a corresponding varying dopant concentration along a dimension of the scintillator. The DOI information can thus be encoded in the signal timing in an imaging system, which can be used to localize a gamma interaction with a high degree of accuracy. The present invention makes use of the fact that decay times in certain scintillators, such as the lanthanide halides (e.g., $LaCl_3$:Ce, $LaBr_3$:Ce), vary considerably with the amount of dopant concentration, and exploits this property to create a scintillator structure in which the dopant concentration varies continuously and sometimes monotonically with depth, e.g., along a length or thickness of a monolithic scintillator.

Fabrication of scintillator structures as described herein can be accomplished using a unique co-evaporation technique, which not only provides control over the dopant concentration during the growth process, but also provides a simple and cost effective method to synthesize complex scintillator structure in the required larger areas. Furthermore, the co-evaporation techniques described herein may be utilized in creating substantially thick scintillators, including those required to provide high absorption efficiency for the 511 keV gamma rays used in PET.

Fabrication systems and evaporation apparatuses described herein permit the co-evaporation of the main scintillator component charge, such as a lanthanide halide, and an associated dopant using two independent sources. Fabrication techniques and structures, as described herein, may be utilized to produce a substantially thick scintillator with the desired dopant concentration variation. Specifically, the rate of deposition of the co-dopant can be well controlled to form a continuous profile in the resulting thick film, so as to create a structure in which the decay time of the light emission varies continuously with depth.

While methods and structures described herein may make use of a variety of different scintillator compositions, lanthanum halide scintillator compositions in general, and cerium-doped $LaCl_3$ in particular, are provided as exemplary embodiments. It will be recognized that these exemplary embodiments are provided by way of example, and not by way of limitation. Referring to the lanthanum halide composition embodiment, $LaCl_3$:Ce, for example, has two decay times: 20 ns and 213 ns. Varying the $CeCl_3$ concentration from 0.1% to 10% changes the fraction of light in the 20 ns component from 15% to 70%. $LaCl_3$:Ce is therefore a good composition for use according to the present invention. $LaCl_3$:Ce is also an excellent scintillator, with light yield similar to NaI:Tl, the standard for scintillator compositions, with the former having even better proportionality. Scintillator compositions of the present invention may further include $LaBr_3$:Ce compositions.

Thus, in one embodiment, scintillator compositions of the present invention can include doped (e.g., Ce-doped) lanthanum halide compositions, where the halide can include a single halide species, such as chloride or bromide, or mixture of halide species. For example, three or more boats may be used to deposit a variable mixture, along either a longitudinal or an axial direction. In one exemplary embodiment, separate boats can be utilized to separately deposit $LaCl_3$ and $LaBr_3$, as well as a dopant such as Ce. The dopant concentration can be constant or varied (e.g., axially or longitudinally), so as to obtain desired characteristics, such as equal amplitude or maximum time differentiation.

Table I, below, illustrates some scintillation properties of $LaCl_3$:Ce. As can be appreciated, the variable mixture scintillator can be calibrated so that DOI information permits gain correction for improved energy resolution and consequent scatter rejection.

TABLE I

Scintillation Properties of $LaBr_3$:Ce and $LaCl_3$:Ce

| $Ce^{3+}$ Concentration (%) | $LaBr_3$ Light Output (Photons/MeV) | $LaBr_3$ Decay Time (ns) (% Light Output) | $LaCl_3$ Light Output (Photons/MeV) | $LaCl_3$ Decay Time (ns) (% Light Output) |
|---|---|---|---|---|
| 0.1 | | | 50,500 | 20 [15%], 213 [85%] |
| 0.2 | 71500 | 23 ns (93.4%), 66 ns (6.6%) | | |
| 0.5 | 71000 | 26 ns (93%), 66 ns (7%) | | |
| 1.0 | | | 50,500 | 20 [33%], 213 [67%] |
| 1.3 | 71000 | 16.5 ns (97%), 66 ns (3%) | | |
| 5 | 70500 | 16 ns (97%), 63 ns (3%) | | |
| 10 | 64500 | 16 ns (94%), 55 ns (6%) | 50,000 | 20 [70%], 213 [30%] |

TABLE I-continued

Scintillation Properties of LaBr$_3$:Ce and LaCl$_3$:Ce

| Ce$^{3+}$ Concentration (%) | LaBr$_3$ Light Output (Photons/MeV) | LaBr$_3$ Decay Time (ns) (% Light Output) | LaCl$_3$ Light Output (Photons/MeV) | LaCl$_3$ Decay Time (ns) (% Light Output) |
|---|---|---|---|---|
| 20 | 64000 | 17 ns (95%), 70 ns (5%) | 38,000 | 25 [76%], 63 [13%], 213 [11%] |
| 30 | 69500 | 18.6 ns (97%), 70 ns (3%) | | |

Phoswich detectors of the present invention can be utilized in a variety of different detection or imaging systems. In one embodiment, phoswich detectors as described herein will find use in PET imaging applications and systems. The ability to determine the DOI in a detector is important for nuclear medicine imaging systems, such as PET. In such systems parallax problems can degrade spatial resolution, so DOI determination can result in significant performance improvements that provide clinical benefits.

The usual detector configuration in PET has thousands of long, thin, scintillation-crystal bars mounted in rings around the patient. The crystals are oriented so that the thinnest dimensions are in the azimuthal and longitudinal (slice thickness) directions for the best spatial resolution and the thickest dimension is along the radial direction, which approximates the gamma ray propagation direction, for good stopping efficiency (see, e.g., FIG. 1A and FIGS. 2A-2C). Groups of such detector bars 10 are usually arranged into blocks viewed by multiple photomultiplier tubes (PMTs). The relative signal intensities in the various PMTs serves to identify in which scintillator bar in the block the gamma interaction occurred. In PET, the patient 12 is injected with positron-emitting radiotracer. The positron annihilates close to the emission location 14, producing two 511 keV gamma rays propagating in opposite directions. If these gamma rays interact "simultaneously" (as determined by detector timing electronics) in detector bars on opposite sides of the ring, this defines a line through the patient, along which the annihilation occurred. False lines can be produced by accidental coincidences between two gamma rays originating in separate annihilations, or from a single annihilation if one of the gamma rays Compton scatters in the patient and subsequently interacts in a detector bar. The detector system must have good timing resolution to suppress the effects of accidental coincidences and good energy resolution to suppress Compton-scattered events. This design works well for on-axis annihilations, but there is a degradation of spatial resolution for off-axis events that increases with distance from the axis due to parallax (see FIGS. 1-2). This problem is referred to as radial elongation, and it can be eliminated or reduced if the DOI of each gamma ray interaction can be determined.

Figure 1B:
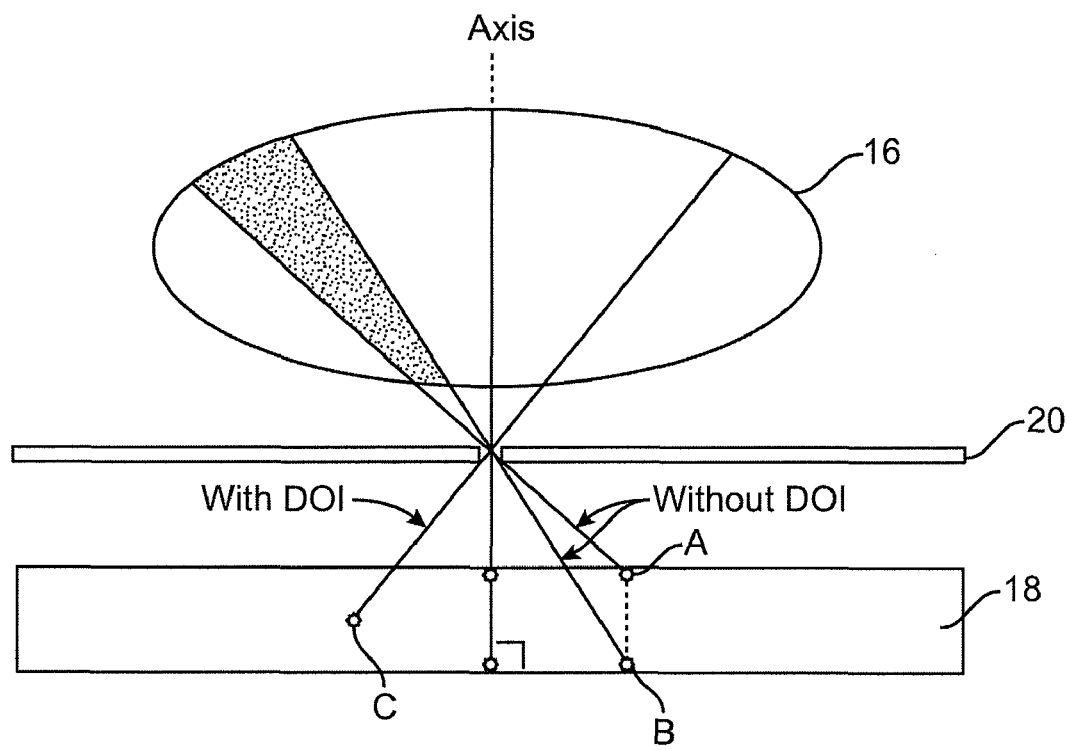
FIG. 1B illustrates degradation in spatial resolution for off-axis events in pinhole imaging.

One advantage of DOI in pinhole imaging (SPECT and planar with converging or diverging collimators) using a continuous phoswich detector of the present invention is illustrated with reference to FIG. 1B. Referring to FIG. 1B, shown is an object 16 or subject for imaging, a scintillator 18, and a collimator 20 (e.g., pinhole in this embodiment) disposed therebetween. For conventional (e.g., non-continuous phoswich detector or non-CPD) scintillator detectors, a scintillation event occurring anywhere on a line between points A and B could have originated anywhere within the shaded region of the scan subject, illustrating the presence of parallax. In contrast, with use of a continuous phoswich detector of the present invention, a scintillation occurring at a particular X,Y location and a particular depth of interaction (point C), could only have occurred somewhere along the line shown in the subject, illustrating a lack of parallax. The same considerations apply to focused multi-hole collimators and coded mask apertures.

Figure 2A:
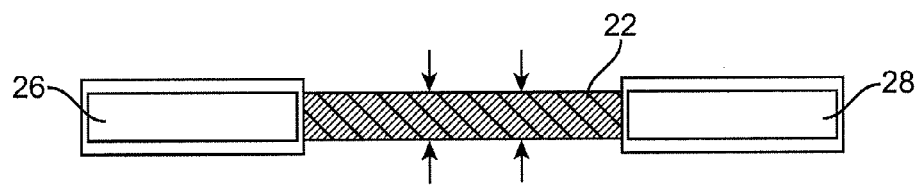
FIG. 2A shows opposed (on-axis) scintillators in PET.
Figure 2B:
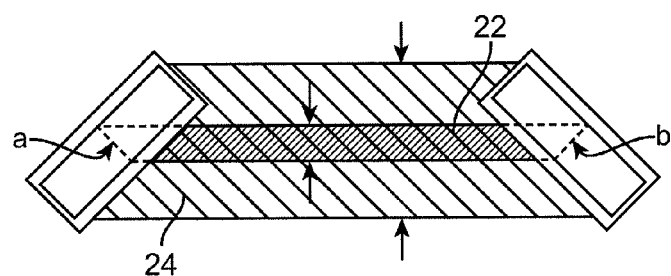
FIGS. 2B and 2C illustrate the improvement in event localization possible with the availability of DOI information in non-opposed (off-axis) scintillators in PET.
Figure 2C:
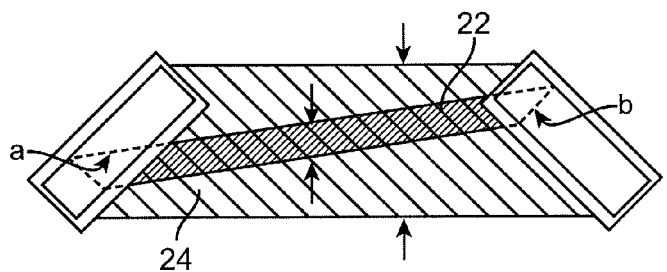

Reduced parallax in PET imaging with the use of continuous phoswich detectors of the present invention is conceptually illustrated with reference to FIGS. 2A through 2C. For each figure, the area (volume) in which positron annihilation could have occurred is shown with use of a continuous phoswich detector of the present invention (shade 22) and with use of a conventional scintillator (or scintillator lacking continuous phoswich characteristics or non-PSD) (shade 24). FIG. 2A shows opposed (on-axis) scintillators 26, 28, where the annihilation occurrence area is identical. FIG. 2B shows non-opposed (off-axis) scintillators, showing a significant difference in occurrence areas. Depths of interaction of each gamma in each detector is shown as "a" and "b". FIG. 2C further shows non-opposed (off-axis) scintillators, showing the significant difference in occurrence areas.

It is noted that DOI is just one potential source of degradation of spatial resolution. Other sources are detector intrinsic spatial resolution, pinhole diameter, scintillator thickness, and distance between source, pinhole and scintillator.

In one embodiment, a phoswich bar for a PET detector suitable for DOI determination will include a single scintillator with continuous variation of decay time along its length due to a concentration variation of a dopant. It will have minimal variation of light yield and wavelength response, as well as have a fast decay time, a high light yield, good stopping power at 511 keV and have a low Compton fraction at 511 keV. Additionally, a detector will have a large enough fraction of light output in the fast decay component that coincidence timing performance would be unaffected by having some light output in a (variable) slow component.

The term "continuous phoswich detector" as used herein, refers to a detector including a single piece structure, or monolithic, phoswich scintillator or scintillator segment having a dopant concentration varying along a length or thickness, and distinguishes from a multi-segment assembly having multiple segments stacked together to provide a difference of dopant concentration along a length or thickness, but where individual segments have a generally uniform dopant concentration (e.g., or lack a dopant concentration variation within in a single or monolithic segment). The term "monolithic" or "monolithically", as used herein, refers to a scintillator or scintillator segment or pixel consisting of a single continuous piece, or a single solid or unbroken piece. Phoswich scintillators or detectors of the present invention may include only a single monolithic scintillator component, or may include a plurality of monolithic scintillator segments forming an assembly of different segments. Thus, a phoswich detector of the present invention can include a monolithic scintillator or monolithic scintillator segment (e.g., pixel) having a dopant concentration varying (e.g., continuously and sometimes monotonically) along a dimension (e.g., length or thickness) of the scintillator/segment.

Matrix scintillation cameras provide another application for the phoswich scintillators described herein. The matrix camera uses a pixelated array of small scintillation crystals viewed by an array of photodiodes or position-sensitive PMTs; these designs have been adopted in small-format scintillation cameras. Existing cameras have somewhat improved spatial resolution compared to conventional Anger cameras, but the energy resolution is limited by the light propagation losses in the long thin scintillation crystals. This problem ultimately limits the spatial resolution attainable with the matrix approach, because most clinical applications require moderate energy resolution to suppress events due to gamma rays that have undergone Compton scattering in the patient. Pinhole collimators or focusing multi-hole, or coded masks, can be used to improve spatial resolution, but because of the entrance angle of the incoming radiation, DOI effects degrade the spatial resolution that could be achievable based on geometric factors of the collimator. According to the present invention, however, cameras can include a matrix with scintillators made of phoswich scintillators, and further include the electronics for DOI determination separately from the signal pulse shapes, with corrections for light losses allowing recovery of the energy resolution. Thus, matrix cameras including phoswich detectors of the present invention may include better resulting energy resolution and allow use of smaller crystal elements, resulting in better spatial resolution. Parallax errors are similarly reduced.

Figure 3:
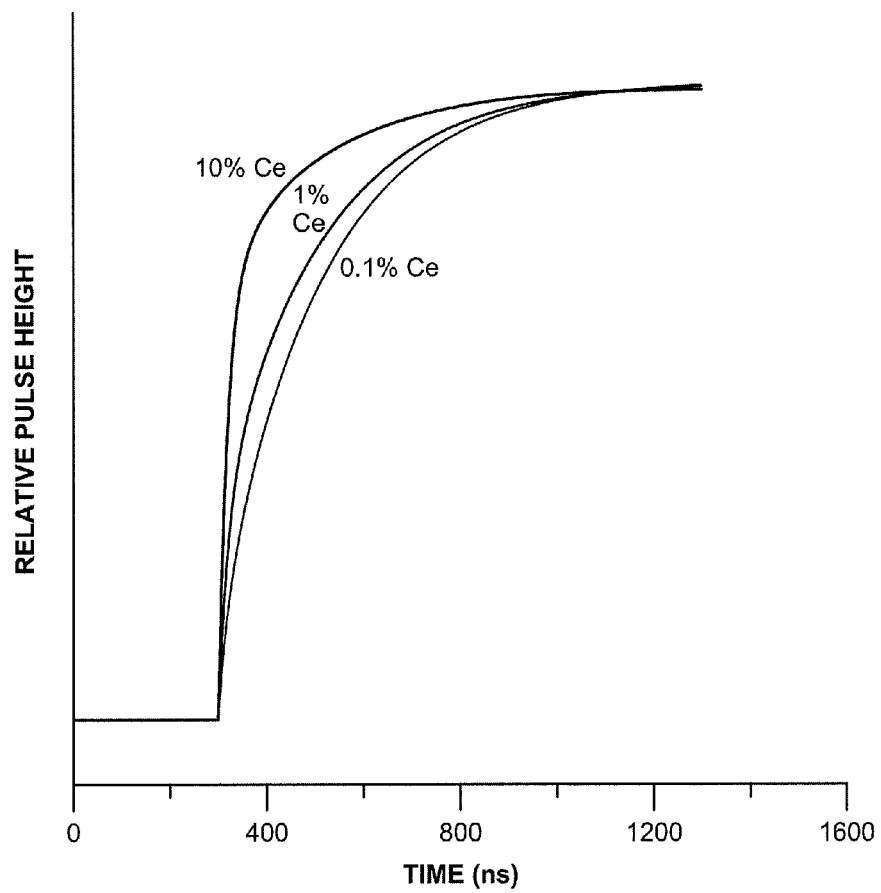
FIG. 3 shows predicted relative pulse shapes for $LaCl_3$:Ce for various Ce concentrations, showing pulse rise time variation.

It is noted that $LaCl_3$:Ce is not the only scintillator having a decay-time variation with Ce concentration, or that can be utilized according to the present invention. GSO shows decay-time variations with Ce concentration, but presents significant fabrication difficulties and, in fact, is not suitable for vapor deposition as described herein due at least partially to the high melting temperature. The light yield of $LaCl_3$:Ce is reasonably constant over the 100:1 range of Ce concentrations needed for the DOI determination process (e.g., about 0.1-10%). Over this same range of Ce concentration, the fraction of light output in the short decay-time component (20 ns) varies from 15% to 70% (see Table II). FIG. 3 shows the predicted relative pulse shapes for $LaCl_3$:Ce for various Ce concentrations. The rise times of the curves are well separated, so that only a few samples in the time domain are sufficient to characterize the Ce concentration and thereby the depth of interaction.

In a PET camera, total signal amplitude is used to select "good" gamma rays and reject those that have Compton scattered in the patient or the detector. The relatively constant light yield with Ce concentration is an advantage for use of $LaCl_3$:Ce in PET because simple thresholds can be used in the electronics for event selection and only minimal corrections should be required later in software/signal processing for final decisions on event acceptance. However, this is somewhat dependent on the choice of light-detection sensor. The main light-emission peak for $LaCl_3$:Ce is at 350 nm, but additional emissions occur at longer wavelengths (390-520 nm) with decreasing Ce concentration. Thus, corrections for total signal output with Ce-concentration variation will be minimal only if broadband detectors are used; e.g., APDs, Si-PDs or PMTs with extended wavelength response.

Another aspect for PET applications is the possible variation of coincidence timing performance due to the variation in the short decay-time component with Ce concentration. At 0.1% Ce concentration, $LaCl_3$:Ce has 20% of its light output in the 20 ns component and 85% in the 213 ns component. The initial photon intensity is 552 photons/ns MeV, similar to that of BGO (600 photons/ns MeV), which has acceptable timing performance. Since higher concentrations of Ce ions in $LaCl_3$:Ce results in 70% of its light output in the 20 ns component, vapor deposited layers of $LaCl_3$:Ce at higher Ce concentrations should have better timing performance than BGO. Differences in timing performance are a complex issue similar to differences in total signal. A Continuous Phoswich PET scintillator should maximize the light in the short decay component. Another aspect for $LaCl_3$:Ce for use in PET is its relatively large Compton fraction (0.85) similar to that of NaI:Tl (0.82); the best Compton fraction among PET scintillators is BGO at 0.56. $LaCl_3$:Ce has a high light yield, 48,000 photons/MeV, and good proportionality (good energy resolution for its light yield; CsI:Tl and NaI:Tl have poor proportionality).

The present invention additionally includes methods and structures for fabricating the described phoswich detectors. For example, phoswich scintillator can be grown using a vapor deposition technique, co-evaporation in a hot wall epitaxy (HWE) apparatus, which allows large volume production in a time-efficient manner, and at an order of magnitude reduced cost compared to current melt-based growth techniques. The disclosed method makes use of salts, such as $LaCl_3$ and $CeCl_3$, and vapor deposits them simultaneously on a suitable substrate using two independent sources. Under different deposition conditions, the material grows in the desired transparent, crystalline or polycrystalline epitaxial layers, or in the polycrystalline columnar form with stoichiometry appropriate for producing efficient scintillation.

Unlike in the standard crystal growth technique, physical deposition from vapor is largely a function of the partial pressures of the constituent materials, allowing fabrication of compositions that are not achievable directly from a melt. This allows formation and evaluation of unconventional compositions of $LaCl_3$ doped with various amounts of Ce needed for the disclosed continuous phoswich. Specifically, methods allow deposition of $LaCl_3$ at a constant rate while varying that for the $CeCl_3$ to produce the desired concentration variation of Ce ions into the $LaCl_3$ lattice. Alternatively, the rate of deposition may be varied for $LaCl_3$, while holding constant the rate of $CeCl_3$ deposition, to achieve identical or similar results. This can prove advantageous because typically significantly more of the primary material than the dopant(s) is being evaporated, and varying the evaporation rate of the main material can provide better control of relative concentration. Also, the specific problems associated with conventional crystal growth of $LaCl_3$:Ce, such as the low growth rate (1 to 3 months) and low yields (resulting from crystal cracking and other difficulties) are avoided. Thus, using our co-evaporation approach, $LaCl_3$:Ce with graded Ce concentration can be fabricated in a matter of hours, and made available in large area formats (e.g., 50×50 $cm^2$ or higher) with an order-of-magnitude lower cost to the customer than is possible using conventional techniques. The thickness of the material in a single layer or slab can be tailored (from tens of microns to about 1 cm or more), with additional processing such as stacking of layers available to provide additional thickness (e.g., 3 cm or more) and high absorption efficiency for the 511 keV gamma ray energies used in PET with minimal degradation in spatial resolution.

TABLE II

Scintillation properties of $LaCl_3$:Ce for different Ce concentrations

| Ce concentration (%) | Light yield (photons/MeV) | Decay time/fraction (ns/[%]) | Initial photons (photons/MeV · ns) |
|---|---|---|---|
| 0.1 | 50,500 | 20 [15%], 213 [85%] | 580 |
| 1.0 | 50,500 | 20 [33%], 213 [67%] | 1043 |
| 10.0 | 50,000 | 20 [70%], 213 [30%] | 1820 |
| 20.0 | 38,000 | 25 [76%], 63 [13%], 213 [11%] | 1253 |

Hot wall evaporation (HWE) techniques, as described herein, include a vacuum deposition technique where scintillator film is efficiently deposited on a surface of a substrate. In the simplest form the HWE apparatus includes of a chamber or cylinder positioned in a vacuum, heated, with an evaporation source "boat" or reservoir at one end (typically the bottom in an upright positioned chamber) and a temperature controlled substrate at the other (typically the top in an upright positioned chamber). In one embodiment, two source boats are used to accomplish co-evaporation of a main source charge and a dopant charge, e.g., lanthanum halide salt and a dopant salt, for deposition of a scintillator film on a substrate surface. The heated cylinder wall serves to enclose, deflect and effectively direct the vapor from the source to the substrate where molecules are deposited with a shallow impinging angle. With the substrate being the coolest part in the system (e.g., compared to the cylinder wall and source material), molecules adhere solely or primarily to the substrate and do not substantially accumulate on the hot walls, making efficient use of the source material. To ensure thermodynamic equilibrium the relationship between the substrate temperature and that of the source and the heated wall should be: $T_{wall} > T_{source} > T_{substrate}$.

The HWE techniques as described herein may provide several advantages, including suitability for large volume scintillator fabrication in a cost-efficient manner, as the described fabrication methods are highly efficient. Additionally, present techniques allow for production of generally thick, large area scintillators that could not be produced generally, and certainly not efficiently, with previously existing techniques.

As indicated, one advantage of present fabrication techniques is high efficiency material deposition, thereby minimizing source material loss during the fabrication process. Scintillator deposition is efficiently directed to the substrate, as the substrate is the coolest part of the evaporation environment. As a result, vapors that impinge on the system parts, including the hot walls, are deflected and mostly condense only on the relatively cool substrate. Consequently, material loss is minimum, enhancing the deposition efficiency. Deposition efficiency has been observed above 30% and well above 50%, in some cases remarkably high and in the order of above about 90% to 95% or more. For example, a 1 cm thick film on a 10×10 cm2 substrate could be deposited using as little as 650 grams of $LaCl_3$ source material. To achieve the same 1 cm thickness using conventional evaporation techniques would require over three kilograms of material, which would be expensive and impractical to handle, and would require significantly greater complexity in the mechanical components and temperature control electronics for the evaporation source in the HWE chamber.

The HWE techniques described herein further advantageously allow preservation of stoichiometry during the deposition process, even where the source material(s) include compounds having relatively large differences in vapor pressures and sticking coefficients. This may be due to the fact that the HWE takes place under conditions of thermodynamic equilibrium, which allows the high vapor pressures of various compounds to be maintained. As a result, the dissociation of various constituents does not present a problem for scintillator deposition as described herein. As a matter of fact, the interaction of components with each other on the substrate surface can lead, under favorable growth conditions, to the formation and growth of the compound. Thus, HWE is particularly advantageous for applications including depositing thick films using two sources—a main component charge and a dopant charge, where the two source materials differ by orders of magnitude in their vapor pressure. For deposition of doped lanthanum halides, for example, HWE will preserve the stoichiometry in the deposited material, such as $LaCl_3$:Ce or $LaBr_3$:Ce.

A valuable aspect of HWE described herein, particularly in thick film deposition, is that the growth rate is an order of magnitude higher than that of conventional systems. For a one-component system the deposition rate is proportional to the impingement rate (Ø) of atoms on the substrate at constant temperature, and is governed by the equation:

$$\emptyset = n(kT/2\pi m)^{1/2}$$

wherein is the number of evaporant molecules per unit volume, m is the mass of the molecule, k is the Boltzmann constant, and T is the source temperature. For hot wall epitaxy of $LaCl_3$:Ce this equation still holds, since the vapor phases of constituent compounds are in equilibrium with the source material. Therefore, the deposition process is basically very similar to that for a single element. As the source temperature T is very high and the substrate is the coldest part in the evaporator, the impingement rate of molecules and hence the film growth rate can be an order of magnitude higher than the conventional systems. The growth rate is related to the impingement rate by the following equation:

$$\text{Growth rate} = \{\emptyset * \text{Avg thickness of the } LaCl_3\text{:Ce monolayer}\}/\text{The surface density of } LaCl_3\text{:Ce}.$$

The process of material growth consists of a series of events that begin with the physical adsorption of a fraction of the incident molecules on the substrate or by forming a stable nucleus by interaction with the other adsorbed molecules. This process of nucleation and growth is typical for the formation of a film of one material on a substrate of a different material. In HWE no nucleation takes place, but growth occurs by direct adsorption of the molecules on low energy sites, such as kinks on an atomic ledge. Under these conditions, even when the growth rate is very high, a mono-layer by mono-layer deposition (epitaxial) growth is obtained resulting in excellent crystallinity of films with superior optical transmission properties.

As noted, the relationship $T_{wall} > T_{source} > T_{substrate}$ in the evaporation apparatus is maintained for at least a portion of the deposition process. The heating/temperature applied to the chamber wall(s), source, and substrate during the deposition process may be selected or defined relative to the melting temperature of a source material. For example, $T_{source}$ may be selected from a range of about 105% to about 125% of a source material melting temperature. $T_{wall}$ may be selected from a range of about 110% to about 150% of a source material melting temperature; and $T_{substrate}$ selected from a range of about 50% to about 80% of a source material melting temperature, or possibly higher.

In the lanthanum halide example, the melting point of $LaCl_3$ is 859 C. Therefore, the source temperature should be in the range of about 900 C to about 1075 C, the wall temperature should be about 945 C to about 1290 C, and the substrate temperature should be about 430 C to about 690 C, while maintaining the relationship $T_{wall} > T_{source} > T_{substrate}$.

Referring again to the doped lanthanum halide scintillator example, deposition occurs under vacuum conditions, typically in a pressure range of about $5 \times 10^{-6}$ Torr base pressure and $5 \times 10^{-5}$ to $5 \times 10^{-4}$ Torr process pressure. Source materials can include doped lanthanum halide crystals (e.g., $LaBr_3$:Ce), or multiple source materials such as a lanthanum halide salt and a dopant salt (e.g., Ce salt). Source temperature will generally be in the range of about 820 C to about 980 C; wall temperature from about 860 C to about 1175 C; and substrate temperature from about 390 C to about 625 C, while maintaining the relationship $T_{wall} > T_{source} > T_{substrate}$. In some embodiments, deposition occurs on a high-temperature substrate about 300-400 degrees C., or above 400-800 degrees C. (and any integral number therebetween).

A HWE apparatus, according to one embodiment of the present invention is described with reference to FIG. 4. The apparatus 30 includes a hot wall deposition chamber 32 illustrated positioned in a vacuum chamber in an upright positioning, having a top portion and a bottom portion. The top portion includes a substrate holder 34, with a deposition substrate 36 illustrated coupled with the holder. The bottom portion includes source material areas or source boats, with a main component (e.g., LaBr$_3$) charge in a first boat 38 and a dopant charge (e.g., CeBr$_3$) in a second boat 40. The apparatus further includes a material deposition control system 42, which may include a heating system 44, configured to control scintillator material deposition on the substrate in the manner desired. In one embodiment, a heating system is configured to achieve the $T_{wall} > T_{source} > T_{substrate}$ relationship during the deposition process. The heating system in the illustrated embodiment includes heating elements 44 (e.g., heater electrodes) coupled with the source boats, chamber wall heating elements 46 (e.g., resistive heating elements), and a substrate temperature control system 48 for heating and/or cooling of the substrate. The apparatus may further optionally include one or more material deposition control elements 50 (e.g., for controlling material deposition rate and/or deposition profile), such as a shutter, which operates on the basis of exposure time or area, disposed between a source material and a deposition surface of the substrate. Other non-limiting examples of a material deposition control element 50 can include a collimator, grating, baffle, or a combination of components. Such deposition control elements can include any variety of configurations suitable for affecting material deposition rate or profile, including uniform or variably sized slots and septa, or one or more perforated baffles, each with uniform or variably sized and spaced holes. One or more charge boats may be movable, disposed in the evaporation chamber such that a distance of the boat from the deposition surface is variably controlled, e.g., during the deposition process, so as to allow deposition of scintillator material having a dopant concentration varying along a thickness of the deposited material (e.g., axially).

To a high-vacuum vapor deposition system with, for example, a 24 inch diameter stainless steel bell jar, roughing pumps and a high vacuum cryo pump, vacuum gauges, two evaporation boats, the necessary power supplies, feed-throughs, and crystal monitors are added a HWE column with appropriate heaters and a water-cooled substrate holder. The walls of the column can be heated using a conformal resistive heater.

The films can be grown on a variety of substrate surfaces, including, for example, a transparent glass plate, which can be borosilicate glass or fused silica, but not soda-lime glass, which has a UV cutoff at 300-350 nm. In depositing the material, the process can advantageously allow for controlling the dopant (e.g., Ce) concentration within deposited films, including controlled variation of the dopant concentration within the films; controlling thickness uniformity (e.g., above 99.5%) over the entire area for uniform detection efficiency and scintillation response; maximizing the optical transmission of the resultant material for improved light collection efficiency; maintaining excellent film adhesion to the substrate; as well as achieving a variation of dopant concentration in the resulting scintillator. For example, in some instances a 100:1 variation from about 0.1% Ce (with 15% light in the 20 ns decay component) to 10% Ce (with 70% light in the 20 ns decay component) can be achieved in the resulting scintillator.

Figure 4:
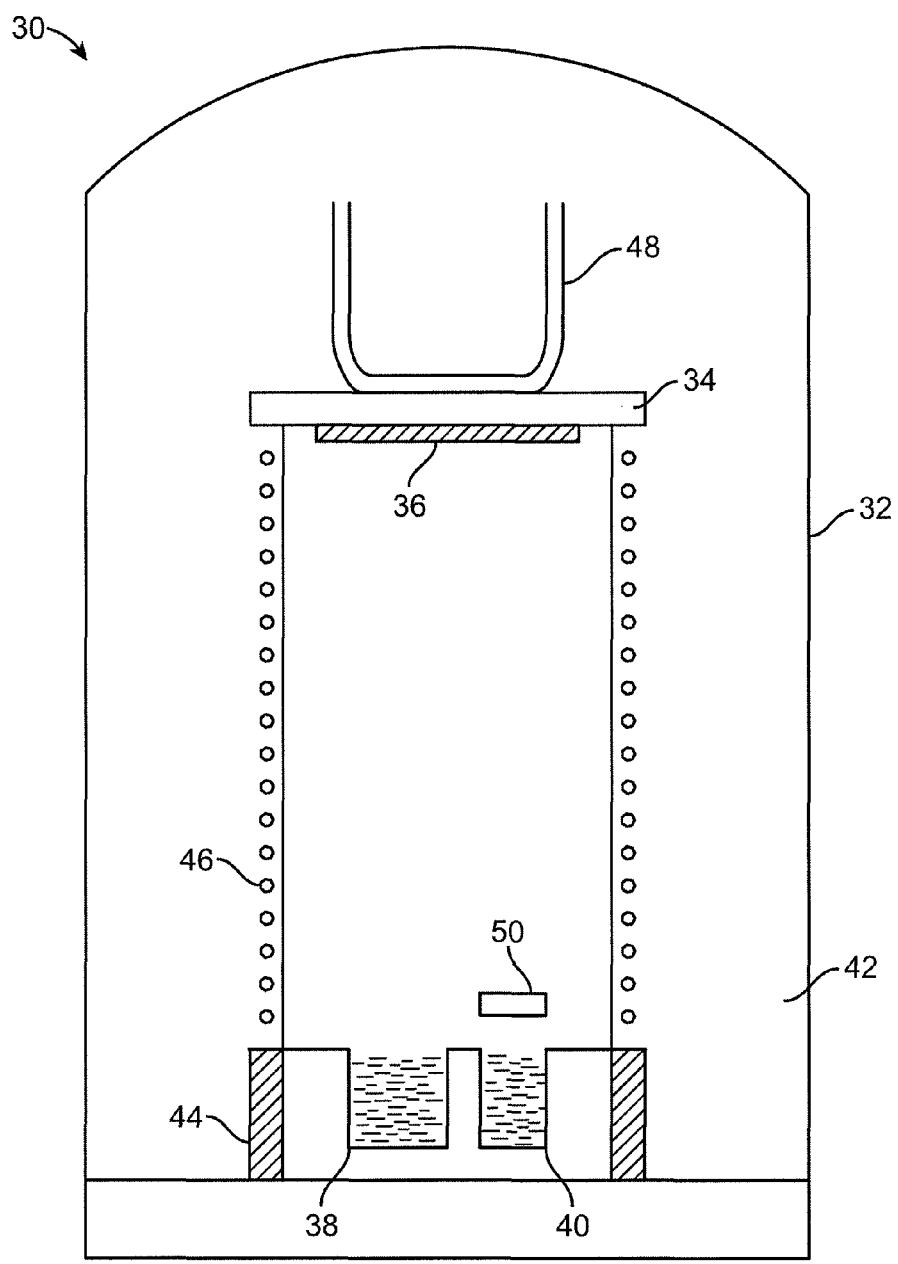
FIG. 4 illustrates an evaporation apparatus according to an embodiment of the present invention, where dopant concentration can be varied along the axial direction (or a thickness) of the deposited film.

In one embodiment of a high-vacuum-based HWE system, as shown in FIG. 4, source materials are co-evaporated using two boats. Co-evaporation from different source boats minimizes difficulties in achieving the proper chemical composition of the deposited material arising from large differences in the vapor pressures of a main component charge and the dopant charge. In the embodiment illustrated in FIG. 4, the source boats and the chamber walls are coupled to heating elements that may provide heating to the substrate. The system may further include a substrate temperature control system to heat and/or cool the substrate. In some instances, for example, the substrate may be heated above the required temperature due to conductive and radiative heat from the wall and the source and, as such, a substrate cooling system may optionally be included. In one example, a cooler can include a Cu substrate holder with a liquid circulation channel coupled to a Neslab chiller. Particular liquids or coolant compositions may be selected for use as a coolant, e.g., with attention paid to the boiling temperatures of a selected liquid.

The resulting film morphology and grain size within films can not only be controlled by the evaporant surface mobility, but also by the substrate temperature and extrinsic parameters such as the vapor deposition angle and deposition rate. As morphology determines the optical transmission and scattering losses in the grown material, precise control of these parameters is important to obtaining high quality growth. The rate of deposition and the stoichiometry of the film, on the other hand, are determined by the relationship between the substrate, the wall, and the source boat temperatures. Optimization of this relationship is therefore important for successful scintillator growth. Again, to produce high quality films the relationship $T_{wall} > T_{source} > T_{substrate}$ is maintained.

A deposition apparatus, such as that illustrated in FIG. 4 above (or FIG. 5 below), can be utilized for depositing scintillator material on the substrate, the deposited scintillator having a dopant concentration varying axially along a thickness of the deposited material. Dopant concentration (e.g., Ce concentration) can be varied axially (e.g., along the thickness direction) by various techniques. In one example, varying the dopant concentration includes varying the temperature applied to one or more source boats during the deposition process, such as varying temperature of the dopant source boat. In another example, an apparatus can include a deposition rate control element, such as a shutter disposed between the source boat and deposition surface, where varying dopant deposition includes actuating the shutter to control material deposition rate. For example, a shutter may be actuated by moving in and out, and/or varying an opening to control material (e.g., Ce dopant) deposition. Also gratings and/or baffles can be used, as described above. In yet another example, one or more charge boats may be movable, disposed in the evaporation chamber such that a distance of the boat from the deposition surface is variably controlled. Varying a distance between a source boat and deposition surface can be controlled or selected so as to deposit scintillator material on the substrate, where the scintillator material has a dopant concentration varying axially or along a thickness of the deposited material. Methods and structures of the present invention may use one or more of the above techniques, as well as additional techniques, for deposition of scintillator material as described.

Fabrication processes may optionally include forming one or more coatings (e.g., protective or reflective coatings) on a surface of a scintillator. Formation of protective coatings atop the deposited material may be performed in situ; i.e., without breaking the vacuum, after completion of the scintillator film deposition cycle. This can include use of an evaporator equipped with sources of protective and reflective materials. An alternate approach is a specialized substrate holder equipped with a spring-loaded window. The window remains open during the scintillator film deposition and is closed after the deposition, before the vacuum is broken with dry $N_2$ gas (typically used to leak the vacuum), using a mechanical trigger located outside of the evaporation chamber. The closed substrate holder, filled with the dry $N_2$, is quickly transferred to a dry chamber for storage.

Protective coatings, such as a para-xylylene polymer composition (e.g., Parylene) coating, can be used as a hermetic sealing layer on scintillator films. Para-xylylene polymer has a very low density and low atomic number, so the incident X-ray/gamma ray flux is not appreciably attenuated in this coating. An approximately 5 μm thick coating is formed by vapor deposition. A reflective layer of aluminum can similarly be deposited on top of the polymer layer. Alternatively, a top cover with a white Teflon reflector can be emplaced with epoxy.

Figure 5:
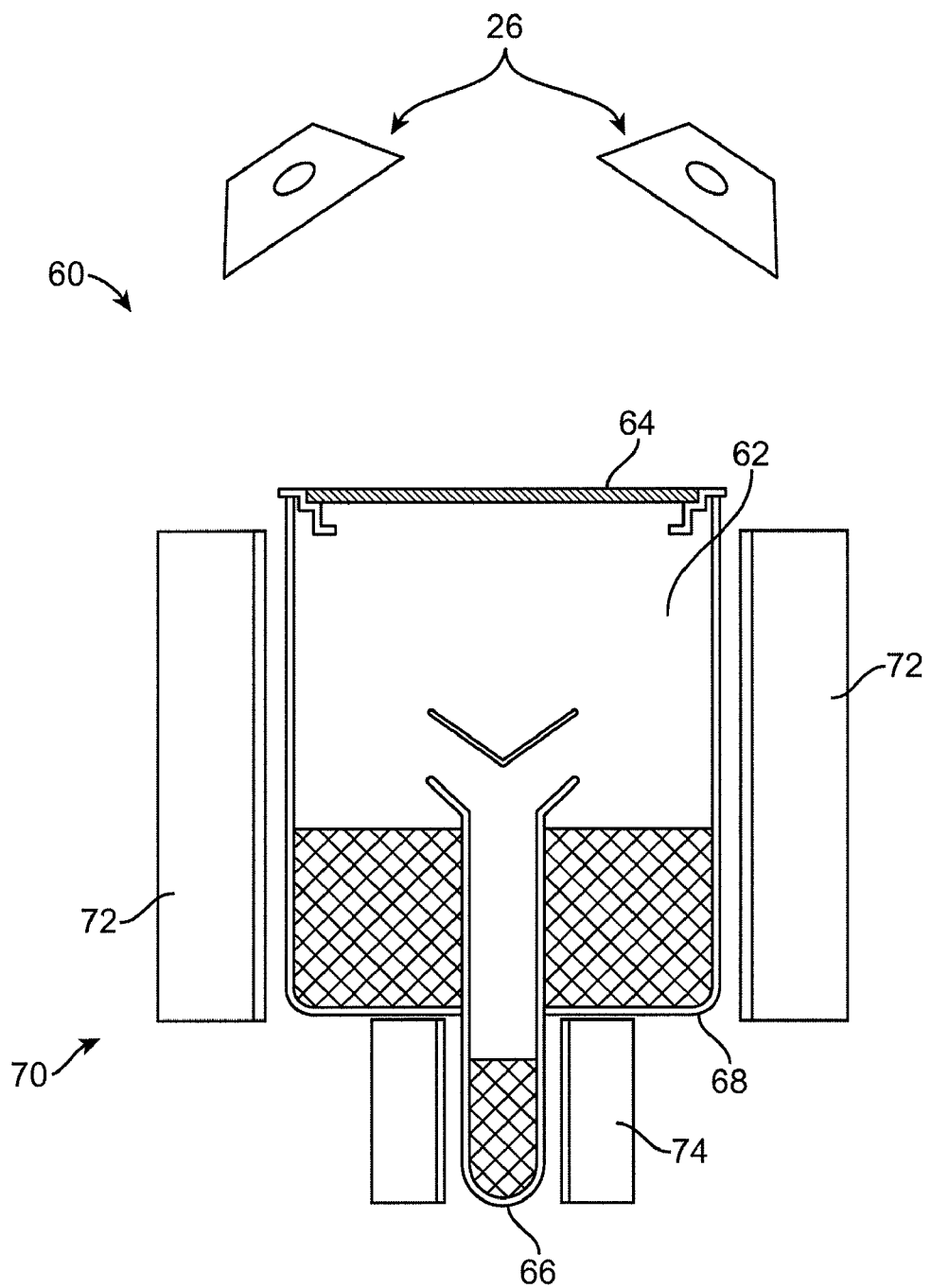
FIG. 5 illustrates an evaporation apparatus according to another embodiment of the present invention, where dopant concentration can be varied axially along a thickness of the deposited film, in a similar manner to that in FIG. 4 above.

FIG. 5 illustrates a hot wall evaporation apparatus according to yet another embodiment. In one embodiment, the described apparatus 60 can be configured and utilized for varying dopant (e.g., Ce) concentration axially or along a thickness of the deposited scintillator material, in a manner similar to that described above. The apparatus includes an evaporation chamber 62 with a substrate holder 64 at a top portion and source material boats at a bottom portion. The source boats include a first boat 66 (e.g., dopant charge boat) positioned within a second boat 68 (e.g., main component charge boat). As illustrated, the first boat extends axially through the second boat, with a bottom portion of the first boat extending below a bottom portion of the evaporation chamber or second boat. The apparatus includes a heating system 70, including main heaters 72 extending along the walls of the chamber and positioned so as to heat the chamber walls and source material within the second boat. Heating of a substrate positioned in the holder may occur due to heating from the main heater. The heating system further includes a heater 74 coupled to the first boat or alternatively to the second boat, and can further optionally include substrate heaters 76. As above, the heating system is activated to maintain the temperature relationship of $T_{wall} > T_{source} > T_{substrate}$ for at least a portion of the deposition process.

In the lanthanum halide scintillator example, heating of up to about 1200-1600 degrees C. is applied to the second boat or main component charge (e.g., lanthanum halide source material), and the dopant heater applies heating of up to about 1200-1600 degrees C. to a dopant charge in the first boat. Walls of the chamber are heated above the temperature of the source materials, whereas substrate temperature is selected to be below the main component charge temperature. Substrate temperature can be up to about 800 degrees C., e.g., in the absence of an activated substrate heater. Substrate temperature can be selected relative to the temperature of the main component charge, and in one embodiment, be 100-200 degrees or more below the main component charge temperature.

Figure 6A:
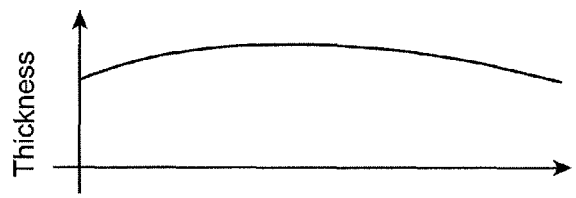
FIGS. 6A through 6C illustrate a film thickness profile (FIG. 6A), dopant concentration profile (FIG. 6B) and evaporation apparatus (FIG. 6C), according to an embodiment of the present invention. The dopant concentration varies along the x-axis or direction along a length of the deposited film.
Figure 6B:
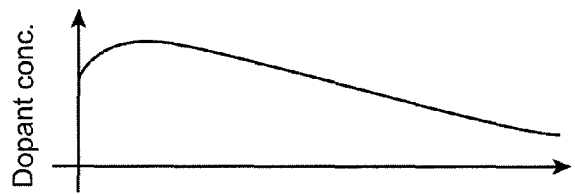
Figure 6C:
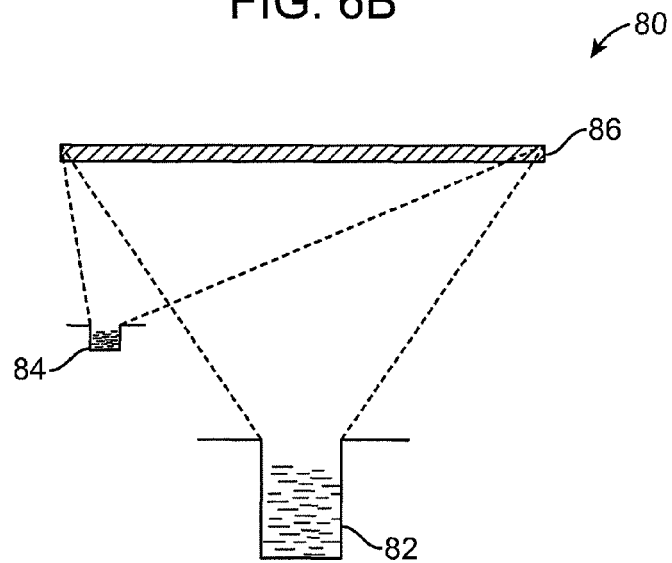

Fabrication techniques and evaporation systems can produce scintillators having dopant concentration variations in a variety of different selected directions or orientations. In one embodiment, a scintillator includes a dopant concentration varying along a thickness of the scintillator. Alternatively, a scintillator can be fabricated having a dopant concentration varying along a length of a scintillator film or slab. For example, an evaporation system can include a dopant source boat laterally off-set or displaced relative to the main component source boat, such that dopant vaporization produces a variation of deposited dopant concentration laterally across or along a length of the substrate. Such an embodiment is illustrated with reference to FIGS. 6A-C. The evaporation system 80, as illustrated in FIG. 6C includes a main source boat 82 and a dopant boat 84 spaced laterally and off-set from the main source boat. In the illustrated embodiment, the dopant boat 84 is positioned in closer proximity to the substrate 86, such that the distance between the substrate and dopant boat is less than the distance between the main source boat and substrate. In use, source materials are evaporated from the boats for vapor deposition on a surface of the substrate. Dopant is deposited so as to create a dopant concentration variation along the length of the deposited scintillator material, with dopant concentration decreasing as distance from the dopant source boat increases. In the illustrated embodiment of FIG. 6C, dopant concentration decreases in the deposited film progressing right to left. FIG. 6A illustrates that the thickness of scintillator deposited on the substrate may be substantially uniform across the surface of the substrate, with possible variation where the scintillator exhibits slightly greater thickness in the center region compared to the deposition surface periphery. FIG. 6B illustrates a dopant concentration variation as indicated above, with dopant concentration decreasing with increasing distance between the deposition surface and the dopant source boat.

Figure 7A:
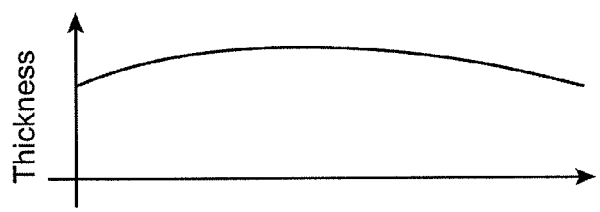
FIGS. 7A through 7C illustrate a film thickness profile (FIG. 7A), dopant concentration profile (FIG. 7B) and evaporation apparatus (FIG. 7C) according to another embodiment of the present invention. Similar to FIGS. 6A-6C, the dopant concentration varies along the x-axis or direction along a length of the deposited film. A material deposition control element, such as a collimator or perforated baffle, as shown in FIG. 7C, can be disposed between a source boat and the deposition surface to shape the concentration profile of deposited material such as the dopant.
Figure 7B:
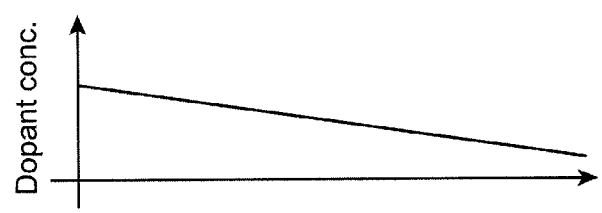
Figure 7C:
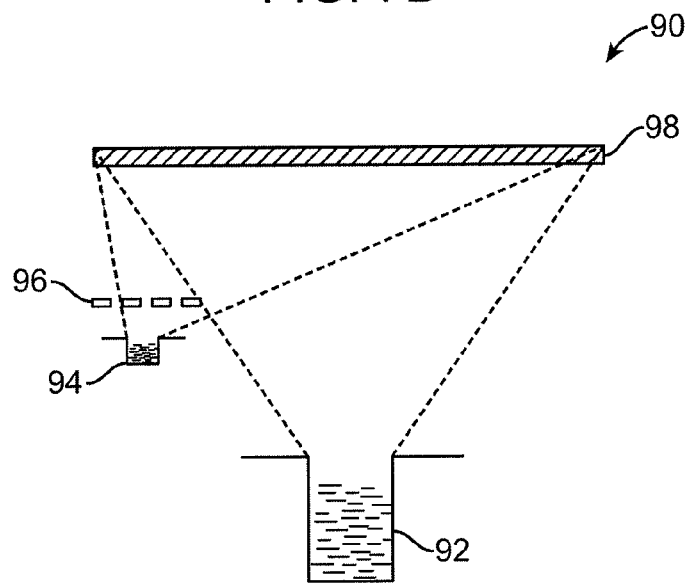

Fabrication methods can further include variations of the technique as illustrated in FIGS. 6A-C, such as using special masks or material deposition control elements, or different relative orientations of the source and substrates. One such technique is illustrated in FIGS. 7A through 7C. FIG. 7C shows an evaporation system 90 similar to FIG. 6C above, including a substrate 78, a main source boat 92, and a dopant source boat 94 laterally spaced from the main source boat. The system further includes a mask 96 positioned between the dopant source boat and the substrate 98. A mask can include a variety of configurations and designs, e.g., a grating or a perforated baffle are specific instances of a mask and may be selected to effect or further modify a doping profile along the scintillator.

Figure 8:
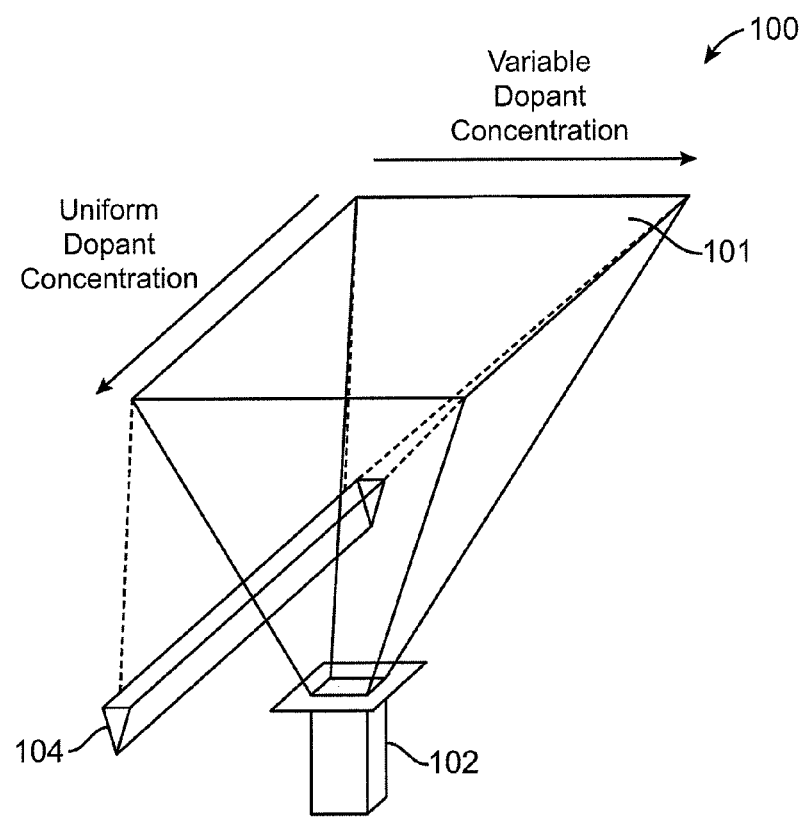
FIG. 8 illustrates an evaporation apparatus according to yet another embodiment of the present invention, the apparatus including an elongated dopant boat for varying the dopant concentration along one axis (e.g., x-axis showing variable dopant concentration) or direction, or along a length of the deposited film, while the dopant concentration is substantially uniform along another axis or direction of the deposited film.

Another embodiment of scintillator fabrication makes use of a narrow, linear, source boat that is slightly longer (e.g., ~4.5 cm) than the substrate (e.g., ~4 cm) for dopant vaporization and strategically locates it beneath and parallel to one of the edges of the substrate. Such an embodiment is illustrated with reference to FIG. 8. The evaporation system 100 of FIG. 8 includes a substrate 101, a main source boat 102, and a dopant source boat 104 laterally offset or spaced with respect to the main source boat. The dopant source boat may be positioned in closer proximity to the substrate compared to the main source boat. Further, the dopant source boat includes an elongated design or profile. The term elongated refers to a length greater than a width of the boat. The dopant boat may optionally be more elongated compared to the main component boat, and, as indicated above, may have a length slightly greater than a length of the substrate side (e.g., compared to a substantially parallel side of the positioned substrate). Such a system configuration will produce a distribution (concentration) of dopant in the deposited film along the direction perpendicular to the linear dimension of the boat that varies as $\cos\theta$, where $\theta$ is the angle between the boat and a given point on the substrate. The resulting film will have a graded dopant concentration along a length, or the X or Y dimension, instead of the Z dimension (depth).

In some embodiments, a resulting scintillator from a fabrication process as described above can be further processed or sliced (mechanically or by laser) following deposition to form long (~4 cm), 1×1 mm wide pixels to be used to form the PET scintillator array. One practice includes the long axis of each pixel being radially disposed in the assembly, and provides the required thickness of the material to produce high efficiency for 511 keV gamma rays.

Phoswich detectors of the present invention can be made by an oblique deposition method as described above with reference to FIGS. 9 A-C, with the concentration variation across or along a length of the scintillator slab and PET detector bars cut from such slabs. A scintillator grown so that the dopant concentration variation is along a planar axis, e.g., x-axis, can be sliced mechanically or by laser machining so that a slab contains many high resolution elements. The pixel length (e.g., about 4 cm) has a dopant concentration variation along the length and is arranged in a detector to be parallel to the gamma ray incidence. This module can be mounted radially in a PET camera, so that the multiple elements provide multiple slice data.

Figure 9A:
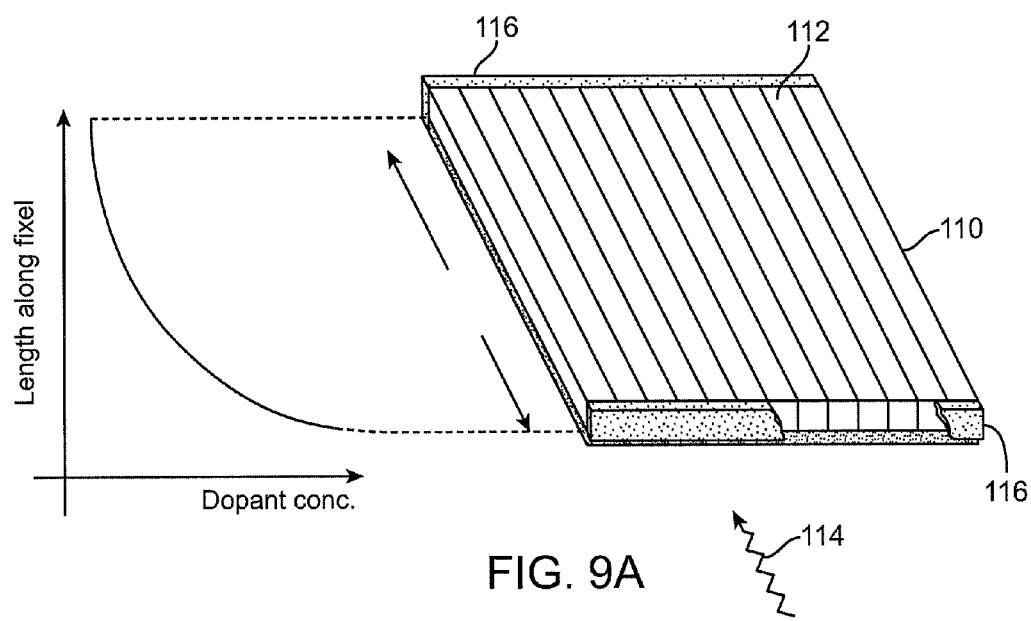
FIG. 9A shows a scintillator slab having a dopant concentration that varies (e.g., continuously) along a length of the scintillator. The scintillator slab is further sliced or processed to form a plurality of elongated segments or pixels, each pixel having a dopant concentration varying along its length. Segments are shown in assembly with coupled photodetectors. Photodetectors can also be disposed along the long axis of the pixel.
Figure 9B:
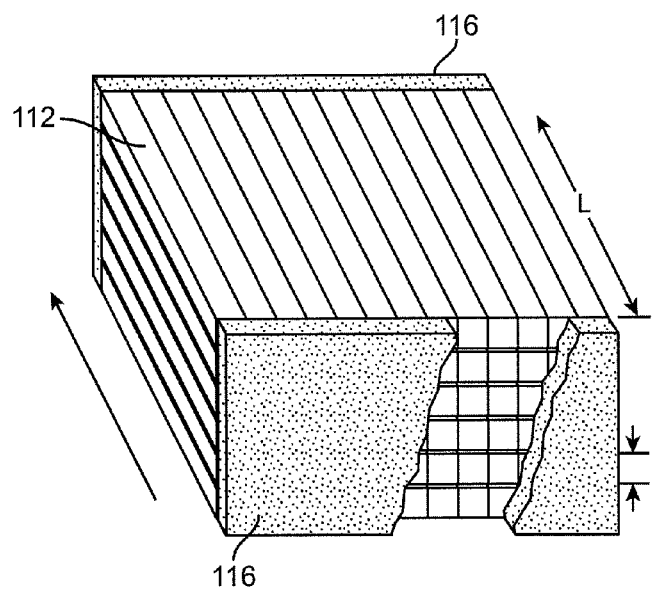
FIG. 9B shows a plurality of elongated segments or pixels as in FIG. 9A, where the different segments or pixels are stacked such that the dopant concentration variations of different segments are arranged in parallel. The stacked segments are show in assembly with coupled photodetectors.

Such an embodiment is described with reference to FIG. 9A, showing a scintillator slab 110 with individual segments or pixels 112 processed or cut from the slab. Individual segments or pixels (e.g., individual monolithic segments or pixels) are elongated, with a dopant concentration variation along the elongate length of the pixel (e.g., as illustrated by the offset dopant concentration graph). An incident gamma ray 114 is shown to illustrate an orientation during radiation detection use, or intended incidence that may provide guidance for detector use and/or further detector assembly. FIG. 9B shows a plurality of elongated segments or pixels 112 as in FIG. 9A, where the different segments or pixels are stacked such that the dopant concentration variations of different segments are arranged in parallel.

Figure 9C:
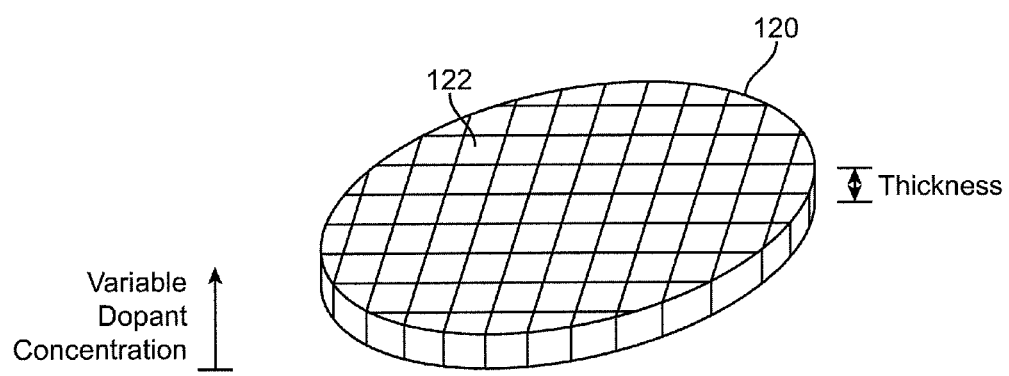
FIG. 9C shows a scintillator slab grown with an axial dopant concentration variation, where the slab is further processed or sliced and assembled in a stacked configuration such that the dopant concentration variation of different pixels or segments are arranged in parallel. A two-dimensional photodetector (not shown) can be optically coupled to at least one circular face of the monolithic array.

FIG. 9C shows a scintillator slab 120 grown with an axial dopant concentration variation, where the slab is further processed or sliced and assembled in a stacked configuration such that the dopant concentration variations of different pixels or segments 122 are arranged in parallel. The slab may include a substantial thickness (e.g., 0.5 cm-1.5 cm; 1 cm or greater) so as to present an efficient gamma camera scintillator, with the varying dopant concentration enabling DOI information.

Thus, scintillator slabs or pixels as described herein, can be processed, e.g., by cutting or dicing scintillators into bars for use in block-type assemblies (e.g., assemblies as illustrated with reference FIGS. 10A-E). Phoswich detectors can be made with monolithic slabs and/or by stacking discrete concentration layers or by stacking continuous phoswich layers of different and exclusive concentration ranges to achieve the desired dimensions.

In one embodiment, the scintillator dopant concentration varies or changes monotonically along the entire length of the scintillator (e.g., preventing ambiguity and errors in depth determination), and the rate of change of the scintillator time response variation always equals or exceeds a certain minimum, which minimum, in combination with the precision and accuracy of the photodetector and its associated electronics, determines the resolution that will be achieved for DOI determinations. In another embodiment, the scintillators are calibrated to correlate decay time information with DOI. In another embodiment, the unit is self-calibrating by recording the lowest and highest decay times and interpolating between them.

Figure 10A:
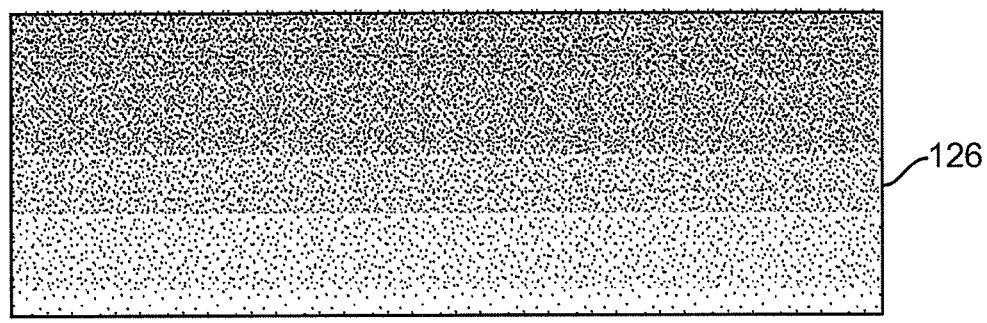
FIGS. 10A through 10E illustrate phoswich scintillators and assemblies, according to various embodiments of the present invention.
Figure 10B:
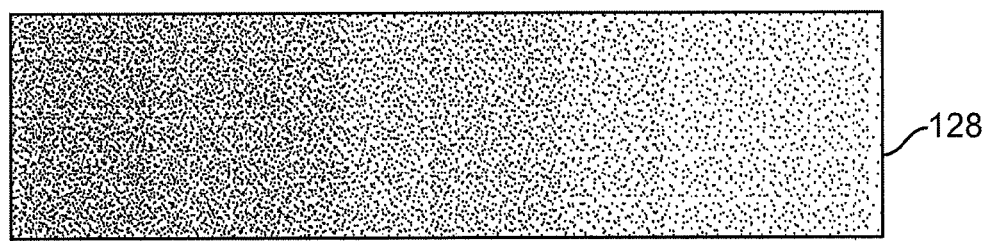

FIG. 10A illustrates a cross-section diagram of a monolithic scintillator 126 or segment of a phoswich detector. The scintillator includes a length greater than a thickness, with a dopant concentration varying (e.g., varying continuously) along the thickness of the scintillator. FIG. 10B illustrates a scintillator 128 with a length greater than the thickness, with a dopant concentration variation along a length of the scintillator.

Phoswich detectors of the present invention may include two or more scintillator layers or segments stacked or coupled together. Segments will generally include the same scintillator chemical composition, with the composition differing only with respect to dopant concentration variation. For example, segments may each include the same cerium doped lanthanum halide composition (e.g., $LaCl_3$:Ce), but differ with respect to cerium concentration or concentration variation of the different segments. In some cases, both the chemical composition and dopant concentration will be substantially the same between different segments or layers.

Figure 10C:
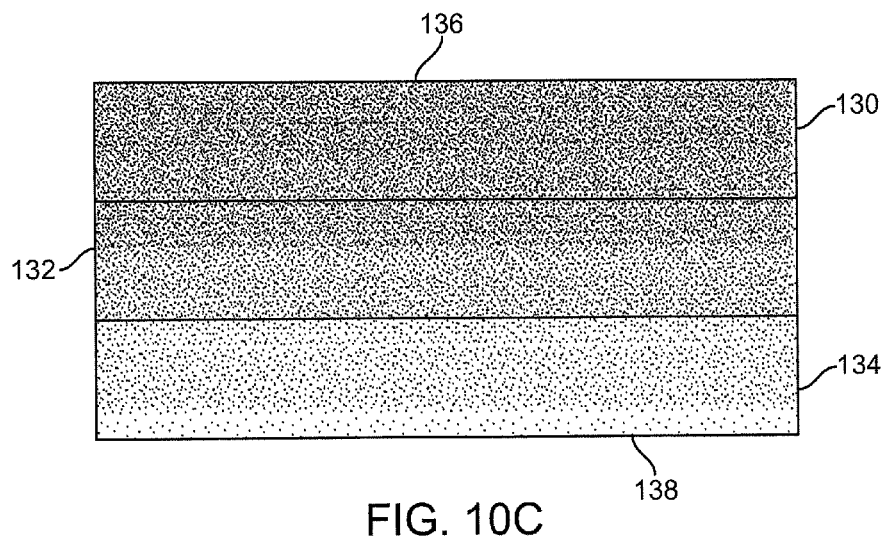

FIG. 10C illustrates a phoswich assembly including scintillator segments 130, 132, 134 according to one embodiment, each segment or layer having a dopant concentration varying along a thickness of the scintillator. The segments or layers are stacked such that the dopant concentration variations of different layers are arranged linearly in sequence. Segments will typically include the same scintillator composition, but may differ in regard to dopant concentration or dopant concentration variations. In one embodiment, dopant concentration variations of the different segments may be selected such that the stacked layers form a substantially continuous concentration variation along the thickness of the stacked layers, such as progressing from the top surface 136 to the bottom surface 138.

Figure 10D:
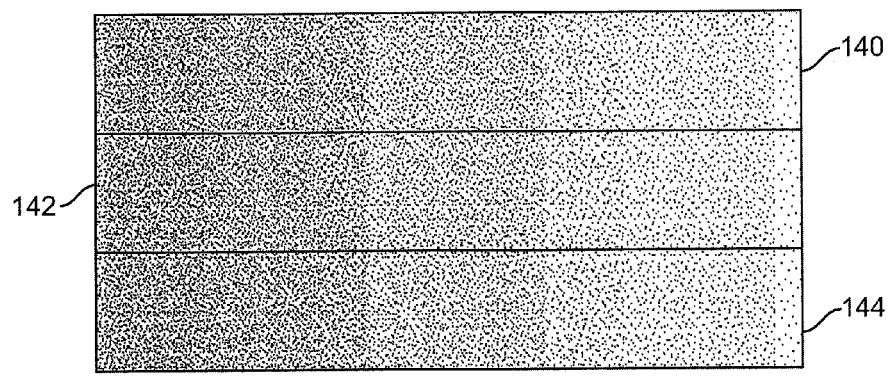

FIG. 10D illustrates a phoswich assembly including scintillator segments 140, 142, 144, according to another embodiment, each segment having a concentration varying along the length of the segment. The segments are stacked such that the dopant concentration variations of different layers are arranged substantially in parallel. In one embodiment, the different segments include the same scintillator composition as well as substantially the same dopant concentration or matching concentration variations. In such an embodiment, the stacked assembly will include substantially the same dopant concentration variation along the length of the assembly, with dopant concentration substantially constant along the assembly thickness.

Figure 10E:

FIG. 10E illustrates a phoswich assembly including different scintillator segments 146, 148, 150. Each segment includes substantially the same scintillator composition, but different dopant concentrations. Rather than including a dopant concentration variation, segments include a substantially uniform or constant dopant concentration through the scintillator slab or segment. Segments can be stacked such that the dopant concentrations of different segments are arranged to proceed from greater dopant concentration to lesser dopant concentration between different segments and along the thickness of the assembly. Assemblies of segments, e.g., as described in FIGS. 10C-E above, can be further and/or alternatively stacked together for formation of different or more complex structures.

It will be recognized that embodiments illustrated in FIGS. 10A through 10C are shown in two dimensions for simplicity. Scintillators and/or segments can have various selected thicknesses or dimensions, or geometric configurations. Scintillators and assemblies (e.g., segment/pixel assemblies), including those illustrated, can be optically coupled about at least one surface to a photodetector. Means for optical coupling can include direct contact between scintillator and photodetector, or indirect coupling, e.g., about one or more optical coupling elements such as fiberoptics, lenses, prisms, mirrors and the like. The photodetectors may be single-element or may be 1-D or 2-D position sensitive arrays.

Figure 11A:
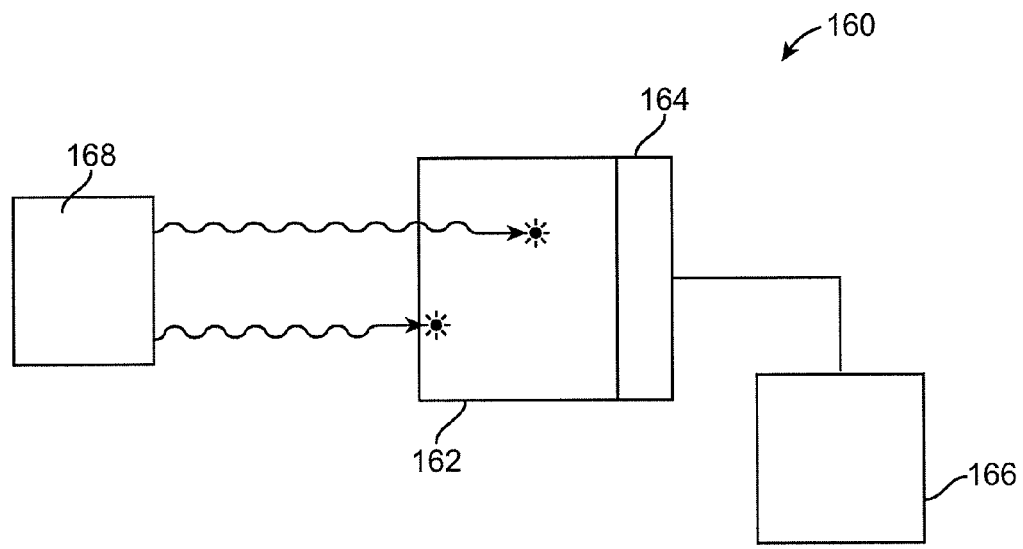
FIG. 11A is a conceptual diagram of a radiation detection system of the present invention.

As set forth above, phoswich detectors and scintillator compositions of the present invention may find use in a variety of radiation detection and imaging applications and systems, including PET and SPECT imaging systems. FIG. 11A is a conceptual diagram illustrating a detection or imaging system 160 including a phoswich detector of the present invention. The detector system 160 includes a phoswich detector 162 optically coupled to a detector assembly including a photodetector 164, which can be position sensitive to make an imaging device. The detector assembly of the system can include a data analysis or computer system 166 (e.g., data acquisition and/or processing device or components) to receive and process signal or information from scintillator 162 and photodetector 164. In use, the system is utilized to detect energetic radiation emitted from a source 168 (e.g., gamma rays emitted from an annihilation event). The photodetector converts the light photons emitted from the scintillator in response to a gamma ray interaction event into electrical pulses or signals that are output and may be shaped, digitized, or processed by the associated electronics. As the phoswich detector 162 will include differing dopant concentrations along a thickness or length (d), signal processing, e.g., by pulse shape discrimination, allows determination of depth of interaction of gamma rays with the detector. Signal processing may make use of known pulse shape discrimination techniques and electronics (see, e.g., *Radiation Detection and Measurement*, Second Edition, Glenn F. Knoll, John Wiley & Sons, (1989, ISBN 0-471-81504-7), pp. 646).

A data analysis, or computer system thereof can include, for example, a module or system to process information (e.g., radiation detection data or signals) from the detector/photodetectors in an invention assembly and can include, for example, a wide variety of proprietary or commercially available computers, electronics, or systems having one or more processing structures, a personal computer, mainframe, or the like, with such systems often comprising data processing hardware and/or software configured to implement any one (or combination of) the method steps described herein. Any software will typically comprise machine readable code of programming instructions embodied in a tangible media such as a memory, a digital or optical recording media, optical, electrical, or wireless telemetry systems, or the like, and one or more of these structures may also be used to transmit data and information between components of the system in any of a wide variety of distributed or centralized signal processing architectures.

Figure 11B:
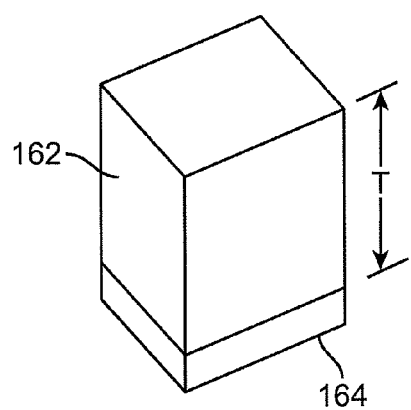
FIG. 11B is a diagram of a phoswich detector, according to an embodiment of the present invention.

FIG. 11B shows a phoswich detector as illustrated in FIG. 11A. The phoswich detector can include one or more scintillators fabricated using an evaporation system as described above. Various sizing, shapes, dimensions, configurations of phoswich detector may be selected depending on intended use and/or system in which the phoswich detector is incorporated. The detector includes a top side and an opposing side (not shown) with a thickness or length having a distance ("T") measuring between the top side or surface of the scintillator and the opposing side or surface. The phoswich scintillator may be coupled to a substrate, as shown. Non-limiting substrate composition examples may include amorphous carbon, glassy carbon, graphite, aluminum, sapphire, beryllium, or boron nitrate. A substrate may include a fiber optic plate, prism, lens, scintillator, or photodetector. The substrate can be a detector device or portion or surface thereof (e.g., optical assembly, photodetector, etc.). The substrate can be separate from a detector device and/or comprise a detector portion (e.g., scintillator panel) that can be adapted to or incorporated into a detection device or assembly. In one embodiment, the scintillator is optically, but not physically, coupled to a photodetector.

Figure 11C:
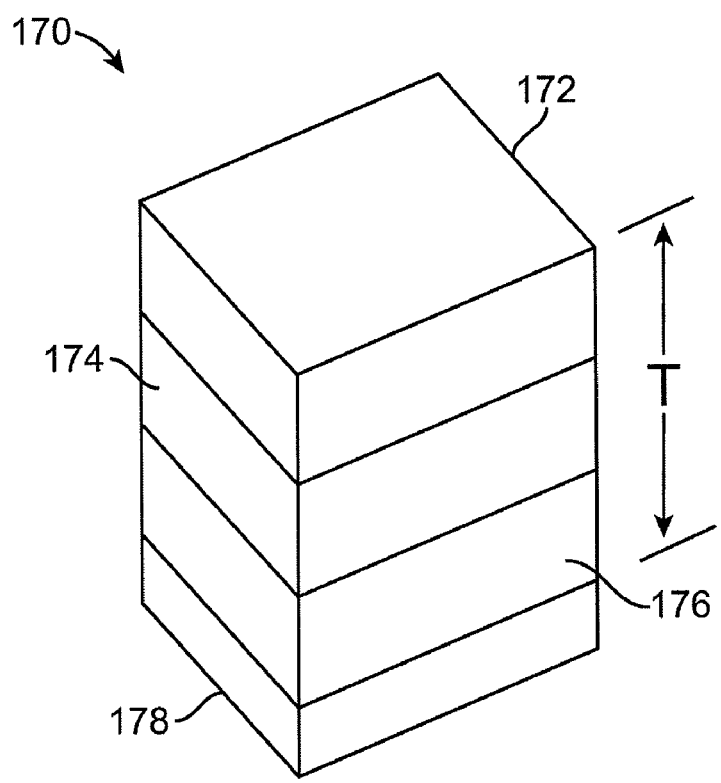
FIG. 11C is a diagram of a phoswich detector including a plurality of scintillator segments stacked axially and coupled with a photodetector.
Figure 11D:
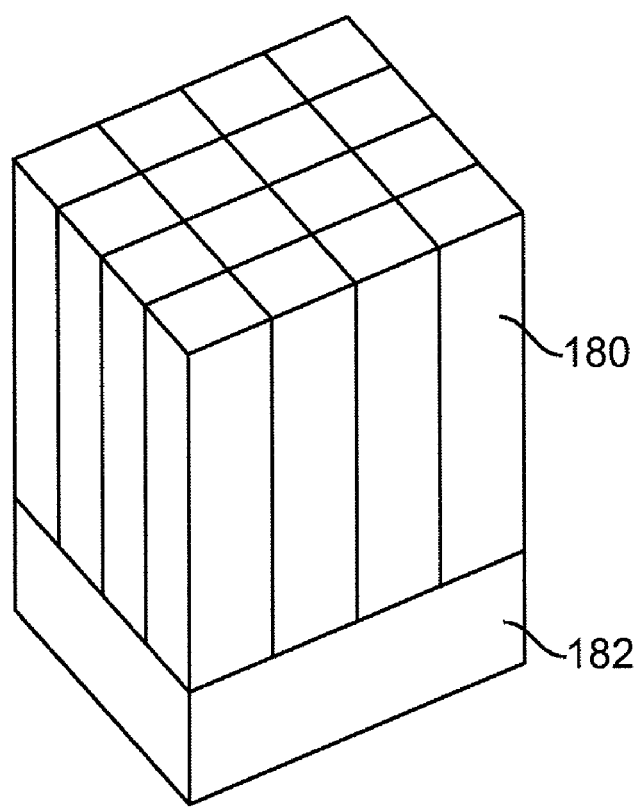
FIG. 11D is a diagram of a phoswich scintillator including a plurality of scintillator segments stacked so as to form a plurality of "pixels" elongated in an axial direction and coupled to a photodetector.

As described above, a phoswich detector can include a single monolithic phoswich scintillator, or may include an assembly of monolithic scintillator segments. FIG. 11C shows a phoswich detector 170 including a plurality of scintillator segments 172, 174, 176 stacked axially and coupled with a photodetector 178. FIG. 11D illustrates a phoswich scintillator including a plurality of scintillator segments 180 stacked so as to form a plurality of "pixels" elongated in an axial direction and coupled to a photodetector 182. Scintillators or segments of a phoswich detector can include those having a dopant concentration varying (e.g., continuously) along a dimension (e.g., length, thickness, etc.) of the scintillator or segment.

Figure 12A:
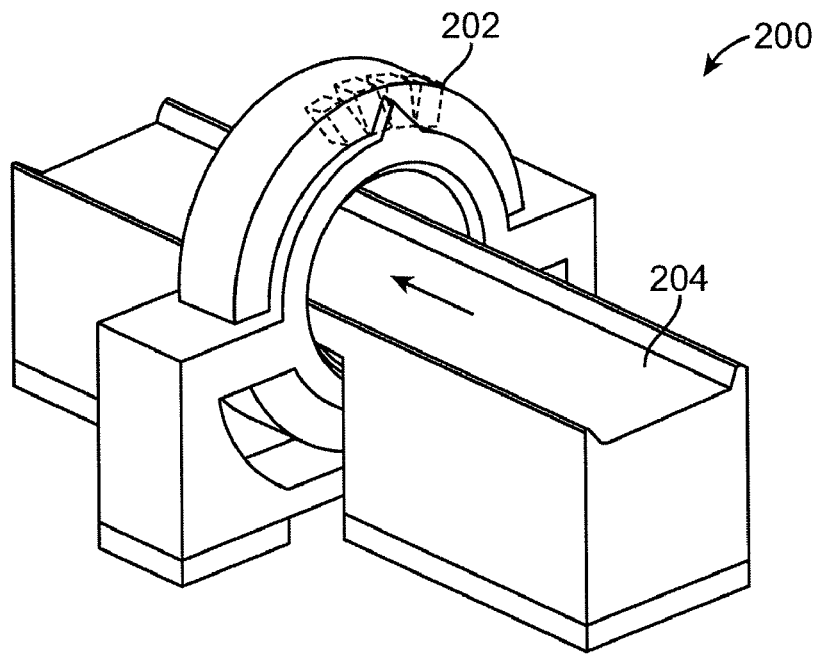
FIG. 12A illustrates a diagram of a PET imaging system.

As set forth above, the present invention further includes PET imaging systems incorporating the phoswich detectors and scintillator compositions as described herein. FIG. 12A illustrates a basic configuration of a PET imaging system 200. In PET imaging, the PET imaging system detects pairs of gamma rays emitted indirectly by a positron-emitting radionuclide (tracer), which is introduced into the subject's body. Images of tracer concentration in 3-dimensional space within the body are then reconstructed by computer analysis. PET imaging systems and aspects of time of flight (TOF) PET imaging are further described in commonly owned U.S. Pat. No. 7,504,634, which is incorporated herein by reference in its entirety for all purposes.

The PET imaging system 200 includes a PET camera system having an array of radiation detectors including phoswich detectors 202 as described herein, which may be arranged (e.g., in polygonal or circular ring) around a patient area 204. In some embodiments radiation detection begins by injecting or otherwise administering isotopes with short half-lives into a patient's body placeable within the patient area. As noted above, the isotopes are taken up by target areas within the body, the isotope emitting positrons that are detected when they generate paired coincident gamma rays. The annihilation gamma rays move in opposite directions, leave the body and strike the ring of radiation detectors.

Figure 12B:
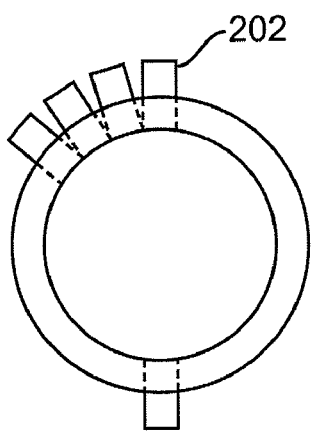
FIG. 12B illustrates an array of detectors for a PET imaging system.

As shown in FIG. 12B, the array of detectors 202 includes an inner ring of scintillators, including phoswich compositions as described herein, and an attached ring of light detectors or photomultiplier tubes. The scintillators respond to the incidence of gamma rays by emitting a flash of light (scintillation) that is then converted into electronic signals by a corresponding adjacent photomultiplier tube or light detectors. A computer control unit or system (not shown) records the location of each flash and then plots the source of radiation within the patient's body. As a phoswich detector in the array will include differing dopant concentrations along a thickness or length, signal processing (e.g., via pulse shape discrimination) will allow for determination of depth of interaction of gamma rays with the detector. The data arising from this process is usefully translated into a PET scan image such as on a PET camera monitor by means known to those having ordinary skill in the art.

Figure 13:
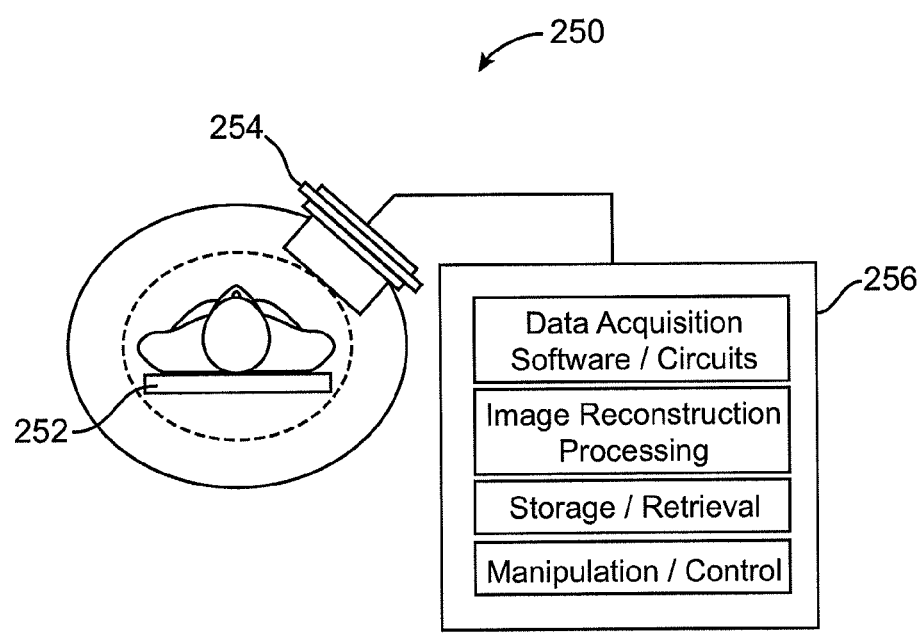
FIG. 13 illustrates a diagram of a single photon emission computed tomography (SPECT) imaging system.

FIG. 13 illustrates a basic configuration of a SPECT imaging system 250, which can include a phoswich detector as described herein. The system 250 can include configurations/components commonly employed in known SPECT systems. As shown, the SPECT imaging system 250 includes a patient or subject area 252 (positioned subject shown for illustrative purposes), a detector assembly 254 and a computer control unit 256. The computer control unit may include circuitry and software for data acquisition, image reconstruction and processing, data storage and retrieval, and manipulation and/or control of various components/aspects of the system. The detector assembly can include a scintillator panel or area including a phoswich scintillator and a photodetector assembly optically coupled to the scintillator material. The system can include a single gamma-camera or detector in the detector assembly or a plurality of detectors, with various configurations and arrangements being possible. As a phoswich detector of the system will include differing dopant concentrations along a thickness or length, e.g., as described above, signal processing (e.g., via pulse shape discrimination) will allow for determination of scintillation event and corresponding scintillator characteristics about the point of photon interaction and, therefore, determination of depth of photon interaction. The detector assembly and subject area may be movable with respect to each other, and may include moving the detector assembly with respect to the subject area and/or moving the subject area with respect to the detector assembly.

In use, radiation detection includes injecting or otherwise administering isotopes (including those commonly employed in SPECT imaging) having a relatively short half-life into the subject's body placeable within the subject area. The isotopes are taken up by the body and emit gamma-ray photons that are detected by the detector assembly. SPECT imaging is performed by using the detector assembly to acquire multiple images or projections (e.g., 2-D images), from multiple angles. The computer control unit is then used to apply image reconstruction and processing, e.g., using a tomographic reconstruction algorithm, to the multiple projections, yielding a 3-D dataset. This dataset may then be displayed as well as manipulated to show different views, including slices along any chosen axis of the body. As described above, the system will include a phoswich scintillator or detector, thereby allowing determination of depth of photon interaction and incorporation in image processing and reconstruction.

The present description refers to doped lanthanum halides, such as $LaCl_3$:Ce and $LaBr_3$:Ce, as exemplary embodiments of phoswich scintillators. However, the described techniques are equally applicable to the fabrication of other phoswich compositions, such as various doped lanthanide halide scintillators, including $LaBr_3$:xx (xx: Pr, Tb or Eu), $LaCl_3$:xx (xx: Ce, Pr, Tb or Eu) and $LuI_3$:xx (xx: Ce or Eu), plus other technologically important scintillators such as $SrI_2$:Eu. As such, the structures and fabrication procedures described herein will be applicable to growing other highly beneficial scintillators in large physical and production volumes, in an economical manner, with formats not possible to achieve using conventional growth techniques.

As indicated, a phoswich scintillator composition of the present invention will include a "dopant". Dopants can affect certain properties, such as physical properties (e.g., brittleness, etc.) as well as scintillation properties (e.g., luminescence, etc.) of the scintillator composition. Non-limiting examples of dopants include cerium (Ce), praseodymium (Pr), lutetium (Lu), lanthanum (La), europium (Eu), samarium (Sm), strontium (Sr), thallium (Tl), chlorine (Cl), fluorine (F), iodine (I). A scintillator composition can include a single dopant only, or a mixture of two or more different dopants. The amount of dopant present will depend on various factors, such as the application for which the scintillator composition is being used; the desired scintillation properties (e.g., emission properties, timing resolution, etc.); and the type of detection device into which the scintillator is being incorporated. For example, a dopant concentration is typically employed at a varying concentration level that may span at least a portion of a range of about 0.01% to less than about 100%, 0.01% to about 20%, or about 0.01% to about 5.0%, by molar weight, as well as any integral number therebetween.

Figure 14A:
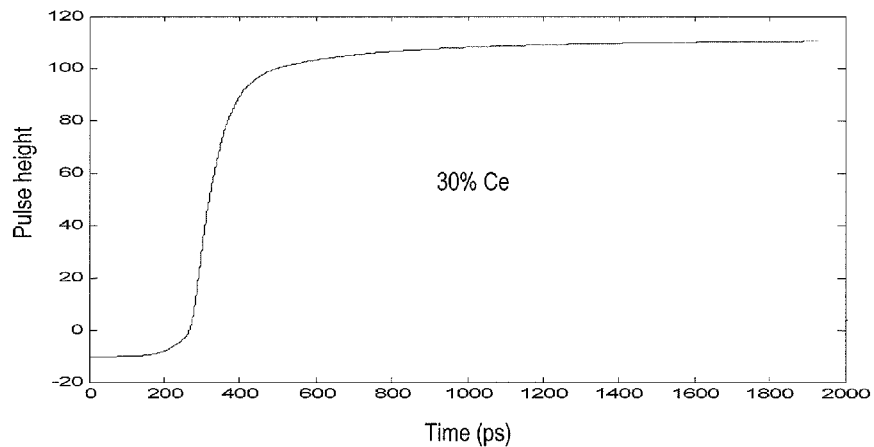
FIGS. 14A through 14C show pulse shape data obtained for $LaCl_3$:Ce for various Ce concentrations including 30% Ce (FIG. 14A), 10% Ce (FIG. 14B), and 5% Ce (FIG. 14C), showing pulse shape variation for different dopant concentrations
Figure 14B:
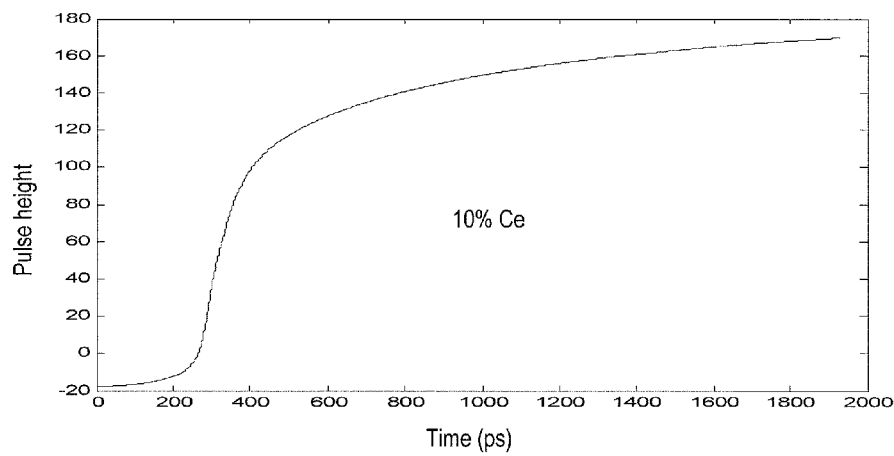
Figure 14C:
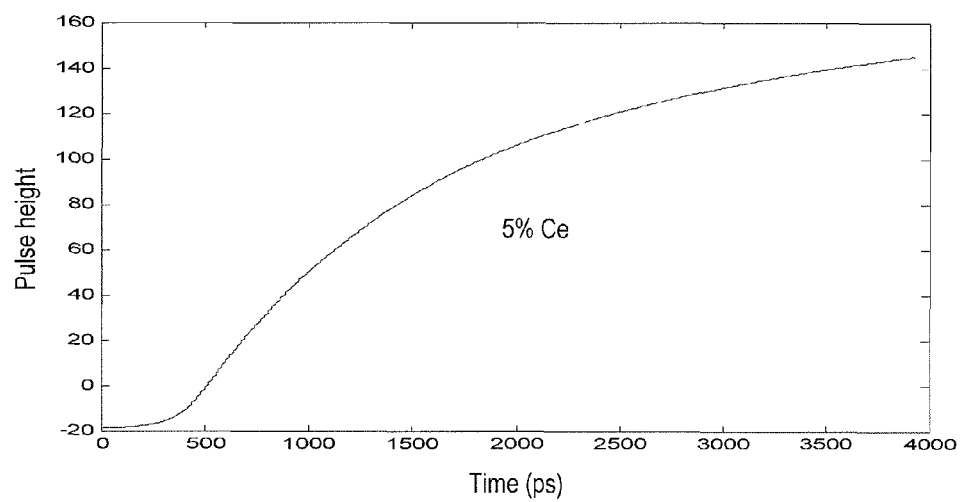

FIGS. 14A through 14C provide plots showing test data obtained for $LaCl_3$ scintillator samples doped with different concentrations of Cerium, as a non-limiting experimental example illustrative of the present invention. The samples were mounted on a Hamamatsu R76001-200 UBA PMT surrounded by a white reflector and irradiated with a $^{57}Co$ source (122 keV). The output of the PMT was put into a Canberra 2005BT scintillation preamplifier and then to a Lecroy 452 Wavesurfer digital oscilloscope. These data were about 1000 samples each of traces from individual gamma ray interactions that were summed to get the plots in FIGS. 14A through 14C. As can be seen, the pulse shapes allow discrimination between samples of different Ce concentration.

The specific dimensions of any of the apparatuses, devices, systems, and components thereof, of the present invention can be readily varied depending upon the intended application, as will be apparent to those of skill in the art in view of the disclosure herein. Moreover, it is understood that the examples and embodiments described herein are for illustrative purposes only and that various modifications or changes in light thereof may be suggested to persons skilled in the art and are included within the spirit and purview of this application and scope of the appended claims. Numerous different combinations of embodiments described herein are possible, and such combinations are considered part of the present invention. In addition, all features discussed in connection with any one embodiment herein can be readily adapted for use in other embodiments herein. The use of different terms or reference numerals for similar features in different embodiments does not necessarily imply differences other than those expressly set forth. Accordingly, the present invention is intended to be described solely by reference to the appended claims, and not limited to the preferred embodiments disclosed herein.

What is claimed is:

1. A radiation imaging system, comprising:
   phoswich detector comprising a monolithic scintillator structure having a dopant concentration varying continuously along a depth of the scintillator; and
   a detector assembly, comprising:
   a photodetector coupled to the phoswich detector so as to detect a scintillation event light pulse from the scintillator and output a scintillation event signal;
   a processing unit coupled to the photodetector to receive the scintillation event signal and determine based on the received signal a depth of interaction of the scintillation event within the scintillator.

2. The system of claim 1, wherein the imaging system is a PET imaging system.

3. The system of claim 1, wherein the imaging system is a SPECT imaging system.

4. The system of claim 1, wherein the rise time and/or decay time of light pulse luminescence varies continuously along the depth of the scintillator.

5. The system of claim 1, wherein the processing unit comprises instructions operable to perform pulse shape analysis of the measured luminescence signal so as to determine depth of interaction of the scintillation event within the scintillator.

6. The system of claim 1, wherein the processing unit is operable to output image date for generating an image based on the processed scintillation event signal.

7. The system of claim 1, wherein the scintillator composition is a doped lanthanum halide including a single halide or mixture of different halides.

8. The system of claim 1, wherein the scintillator composition is Cerium doped $LaCl_3$ or $LaBr_3$.

9. The system of claim 1, wherein the detector comprises only a single monolithic scintillator.

10. A radiation imaging system, comprising:
 phoswich detector comprising an assembly of scintillator segments, the assembly including a first scintillator segment presenting a single-piece crystalline scintillator structure having a first side and a second side and a dopant concentration varying along a distance between the first and second sides; and
 a detector assembly, comprising:
  a photodetector coupled to the phoswich detector so as to detect a scintillation event light pulse from the first segment and output a scintillation event signal;
  a processing unit coupled to the photodetector to receive the scintillation event signal and determine based on the received signal a depth of interaction of the scintillation event within the first scintillator segment.

11. The system of claim 10, wherein the imaging system is a PET or SPECT imaging system.

12. The system of claim 10, wherein the assembly of scintillator segments comprises a plurality of stacked single-piece crystalline scintillator segments, each stacked segment having a dopant concentration varying along a length or thickness.

13. The system of claim 12, wherein each of the stacked segments has substantially the same dopant concentration variation along a length, and the segments are stacked such that the dopant concentration variations of different segments are arranged in parallel.

14. The system of claim 12, wherein each of the stacked segments has a dopant concentration variation along a thickness, and the segments are stacked such that the dopant concentration variations of different segments are arranged linearly in sequence.

15. The system of claim 12, wherein the assembly of segments includes stacked segments directly coupled together.

16. A positron emission tomography (PET) imaging system, comprising:
 a patient area;
 an assembly of radiation detectors disposed adjacent to the patient area, wherein at least one of the radiation detectors comprises: a phoswich detector comprising a monolithic scintillator structure having a dopant concentration varying continuously along a depth of the scintillator; and a photodetector assembly coupled to the phoswich detector;
 a control system coupled to the radiation detectors.

17. The system of claim 16, wherein the photodetector assembly is coupled to the phoswich detector to detect a scintillation event light pulse from the scintillator and output a scintillation event signal.

18. The system of claim 16, wherein the control system includes a processing unit coupled to the photodetector assembly to receive the scintillation event signal from the photodetector assembly and calculate based on the received signal a depth of interaction of the scintillation event within the scintillator.

19. The system of claim 1, 10, or 16, wherein the dopant concentration varies continuously and monotonically along a depth or distance of the scintillator.

20. A positron emission tomography (PET) imaging system, comprising:
 a patient area;
 an assembly of radiation detectors disposed adjacent to the patient area, wherein at least one of the radiation detectors comprises: a phoswich detector comprising an assembly of scintillator segments, the assembly including a first scintillator segment presenting a single-piece crystalline scintillator structure having a first side and a second side and a dopant concentration varying along a distance between the first and second sides; and a photodetector assembly coupled to the phoswich detector;
 a control system coupled to the radiation detectors.

21. A method of detecting radiation from a source, comprising:
 providing a detection system comprising a phoswich detector comprising a monolithic scintillator having a dopant concentration varying continuously along a depth of the scintillator, and a detector assembly coupled to the phoswich detector to detect a light pulse luminescence from the scintillator as a measure of a scintillation event;
 positioning the system such that a radiation source is within a field of view of the system so as to detect emissions from the source;
 measuring a scintillation event luminescence signal from the scintillator; and
 processing the measured luminescence signal so as to identify a depth of interaction of the scintillation event within the scintillator.

22. The method of claim 21, wherein the detection system is a PET or SPECT imaging system.

23. The method of claim 21, wherein the scintillator comprises a first side opposite a second side and the dopant concentration varies continuously along the depth between the first and second sides.

24. The method of claim 21, wherein the rise time and/or decay time of light pulse luminescence varies continuously along the depth of the scintillator.

25. The method of claim 21, wherein the processing the measured luminescence comprises performing pulse shape analysis of the measured luminescence signal so as to determine depth of interaction of the scintillation event within the scintillator.

26. The method of claim 21, wherein the dopant is Cerium and wherein the scintillator composition is a doped lanthanum halide including a single halide or mixture of different halides.

27. The method of claim 21, wherein the scintillator composition is Cerium doped LaCl3 or LaBr3.

28. The method of claim 21, wherein the detector comprises only a single monolithic scintillator.

29. The method of claim 21, wherein the scintillator is formed by a process comprising evaporating a dopant source material and a main scintillator source material from different source boats in an evaporation chamber having one or more heated walls during vapor deposition of the scintillator on a substrate, and wherein a temperature relationship of $T_{wall} > T_{source} > T_{substrate}$ is maintained for at least a portion of the deposition process.

30. A method of detecting radiation from a source, comprising:
 providing a detection system comprising a phoswich detector comprising an assembly of scintillator segments, the assembly including a first scintillator segment presenting a single-piece crystalline scintillator structure having a first side and a second side and a dopant concentration varying along a distance between the first and second sides, and a detector assembly coupled to the phoswich detector to detect a light pulse luminescence from the first segment as a measure of a scintillation event;

positioning the system such that a radiation source is within a field of view of the system so as to detect emissions from the source;

measuring a scintillation event luminescence signal from the first segment; and processing the measured luminescence signal so as to identify a depth of interaction of the scintillation event within the first segment.

31. The method of claim 30, wherein the assembly of scintillator segments comprises a plurality of stacked scintillator segments, each stacked segment having a dopant concentration varying along a length or thickness.

32. The method of claim 31, wherein each of the stacked segments has substantially the same dopant concentration variation along a length, and the segments are stacked such that the dopant concentration variations of different segments are arranged in parallel.

33. The method of claim 31, wherein each of the stacked segments has a dopant concentration variation along a thickness, and the segments are stacked such that the dopant concentration variations of different segments are arranged linearly in sequence.

34. The method of claim 31, wherein the dopant concentration varies continuously and monotonically along the distance between the first and second sides.

* * * * *